United States Patent
Tsuchiya et al.

(10) Patent No.: US 9,009,204 B2
(45) Date of Patent: Apr. 14, 2015

(54) STORAGE SYSTEM

(71) Applicant: Hitachi, Ltd., Tokyo (JP)

(72) Inventors: Akiyoshi Tsuchiya, Tokyo (JP); Jun Nemoto, Tokyo (JP); Hitoshi Kamei, Tokyo (JP); Masakuni Agetsuma, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/232,993

(22) PCT Filed: Apr. 4, 2013

(86) PCT No.: PCT/JP2013/060275
§ 371 (c)(1),
(2) Date: Jan. 15, 2014

(87) PCT Pub. No.: WO2014/162550
PCT Pub. Date: Oct. 9, 2014

(65) Prior Publication Data
US 2014/0304226 A1  Oct. 9, 2014

(51) Int. Cl.
*G06F 17/30* (2006.01)

(52) U.S. Cl.
CPC .................. *G06F 17/30575* (2013.01)

(58) Field of Classification Search
CPC ..... G06F 3/0647; G06F 12/02; G06F 12/023; G06F 17/30079; G06F 17/303
See application file for complete search history.

(56) References Cited

U.S. PATENT DOCUMENTS

| 6,397,311 | B1 | 5/2002 | Capps | |
|---|---|---|---|---|
| 2002/0116588 | A1* | 8/2002 | Beckert et al. | 711/161 |
| 2008/0313244 | A1* | 12/2008 | Ito et al. | 707/204 |
| 2009/0063556 | A1* | 3/2009 | Nemoto et al. | 707/103 R |
| 2009/0150628 | A1 | 6/2009 | Nakano et al. | |
| 2010/0115222 | A1* | 5/2010 | Usami | 711/170 |
| 2010/0138624 | A1* | 6/2010 | Seki et al. | 711/165 |
| 2010/0287217 | A1* | 11/2010 | Borchers et al. | 707/813 |
| 2011/0185139 | A1* | 7/2011 | Inoue et al. | 711/165 |
| 2011/0202720 | A1* | 8/2011 | Rossi et al. | 711/114 |
| 2012/0016838 | A1 | 1/2012 | Arai et al. | |
| 2013/0117515 | A1* | 5/2013 | Ashmore et al. | 711/162 |

FOREIGN PATENT DOCUMENTS

| JP | 2009-145967 A | 7/2009 |
|---|---|---|
| WO | 2011/148496 A1 | 12/2011 |

OTHER PUBLICATIONS

Yoshida, Y., "In-Depth Coverage: Storage Virtualization", Nikkei Computer, Feb. 3, 2010, pp. 111-115, No. 749.

* cited by examiner

*Primary Examiner* — Daniel Kinsaul
(74) *Attorney, Agent, or Firm* — Mattingly & Malur, PC

(57) ABSTRACT

Regarding a method for migrating a file system by copying a file from a migration source to a migration destination and deleting the file at the migration source, a retention of a file in a page (allocation unit of a thin provisioning function) is either suppressed or solved, and two methods are proposed for solving the problems and for enabling migration of a file system in which the increase of utilization of storage capacity is suppressed, wherein one method changes the location of a file prior to performing copying so that the file to be copied next is located in the same page, and another method creates a reverse index table to recognize which block is used by files, thereby enabling to specify the file remaining within a page and copy the same by referring to this reverse index table.

6 Claims, 20 Drawing Sheets

FIG. 8

800 VOLUME MANAGEMENT TABLE

| LOGICAL PAGE NUMBER (800A) | LOGICAL ADDRESS (800B) | PHYSICAL DEVICE (800C) | PHYSICAL ADDRESS (800D) |
|---|---|---|---|
| 0 | 0x00000000 | 1 | 0x00500000 |
| 1 | 0x01000000 | 3 | 0x00200000 |
| 2 | 0x02000000 | 2 | 0x00120000 |
| 3 | 0x03000000 | - | - |
| ... | ... | ... | ... |

Fig. 17

REVERSE INDEX TABLE

| BLOCK NUMBER | SIZE (UNIT: BLOCK) | PATH NAME |
|---|---|---|
| 50 | 50 | /dir1 |
| 100 | 50 | /file1 |
| 150 | 100 | /dir1/file1-1 |
| 250 | 50 | /dir1/dir1-1 |
| 300 | 100 | /dir2 |
| 400 | 200 | /file1 |
| 600 | 50 | /dir1/dir1-2 |
| ... | ... | ... |

STORAGE SYSTEM

TECHNICAL FIELD

The present invention relates to a method for migrating a file system in a storage system, capable of suppressing the increase of storage capacity utilization.

BACKGROUND ART

One method for migrating file systems involves copying files and directories to a migration destination volume. In the following description, if not specifically distinguished, files and directories are collectively referred to as objects.

At this time, a method utilizing a thin provisioning function is adopted so that migration can be performed even if there is only little free space in the storage subsystem, and this method includes the following procedure. An object is copied from a migration source volume to a migration destination volume. At this time, an allocation unit (which is a page) of the thin provisioning function is allocated to the migration destination volume when needed. Thereafter, the copied object is deleted from the migration source volume. At this time, the pages not being used out of the pages allocated to the migration source volume are released as needed from the migration source volume. This arrangement enables to suppress the increase of used capacity of the storage.

However, a page cannot be released unless all the objects within the page have been copied. Therefore, there may be cases where a small number of non-copied objects remain in pages, so that the pages cannot be released immediately. In order to enable migration even if there is only a small free capacity in the storage subsystem, it is necessary to release pages as quickly as possible and suppress increase of capacity utilization of the storage.

Therefore, it is effective to apply a defragmentation technique as disclosed in patent literature 1 prior to migrating the file system. A defragmentation technique is a technique for solving the state where blocks constituting a single object are dispersed within the storage system, and locating the blocks in successive areas. According to this defragmentation technique, successive areas become free spaces when a single file is deleted, so that a large free space can be created within a page and the page can be released promptly.

Further, patent literature 2 teaches an art of sorting objects at a start position of object data within the storage and performing backup of the objects. Similar to patent literature 2, the retention of file data within pages can be suppressed by determining the order for copying files to start with files having start positions within the same page.

CITATION LIST

Patent Literature

[PTL 1]
U.S. Pat. No. 6,397,311
[PTL 2]
Japanese Patent Application Laid-Open Publication No. 2009-145967

SUMMARY OF INVENTION

Technical Problem

However, the techniques taught in patent literatures 1 and 2 have the following drawbacks, respectively.

The defragmentation technique as taught in patent literature 1 is a technique for changing location so that blocks constituting a single object are arranged successively within a disk. In other words, the defragmentation technique is not aimed at changing the locations of objects by considering the order of pages and copying order. Therefore, according to the disclosed defragmentation technique, it is not possible to solve the problem of having objects that will not be copied for a while located in the same page where copied objects are located, so that the problem of objects remaining within the page occurs.

For example, in a file system where a large number of small-sized objects exist, multiple objects are located in a single page. Therefore, if an object to be copied at an early stage of migration and an object to be copied at a final stage of migration are located in the same page, the page can only be released at the last stage of migration.

Further, according to the technique taught in patent literature 2, only the correspondence between an object and a single block which is the start position of object data within the storage is retained. Therefore, if blocks constituting an object are dispersed to multiple positions, it is not possible to recognize the objects using a certain block. Thus, the copying order cannot be determined so that objects are copied in page units starting from objects located within a single page, and the retention of objects in a page cannot be prevented or solved.

The present invention aims at solving the problems mentioned above, by providing a system for suppressing or solving the retention of files in a page (allocation unit of thin provisioning), and for enabling migration of a file system having suppressed the increase of utilization of storage capacity.

Solution to Problem

The present invention aims at suppressing the retention of objects in a page and solving the problem by providing the following two methods for copying objects according to a certain order at a normal state, and when the capacity utilization of a storage becomes equal to or greater than a given threshold, creating a large number of unused pages.

Method 1: Location of objects are changed to pages according to a copy order of objects.

Method 2: The copy order is determined according to the location of objects in a page.

Method 1 changes the location of files before copying objects so that the object to be copied next is located in the same page as the former object as much as possible.

Method 2 creates a reverse index table to recognize which objects are using the block, and refers to the table to specify the objects remaining in the page and to copy the same.

In a file system capable of acquiring the information of objects located at close positions within the disk, the objects can be copied according to the order considering such information even during ordinary states. For example, XFS is a file system having a property where files arranged immediately below the same directory are located at close positions within the disk as much as possible.

Advantageous Effects of Invention

The present invention exerts an effect in which migration of a file system is enabled even when there is little free space in the storage subsystem.

BRIEF DESCRIPTION OF DRAWINGS

FIG. 8 is a view showing an internal configuration of a volume management table of the storage subsystem to which the present invention is applied.

FIG. 17 is a view showing an internal configuration of a reverse index table for acquiring a path name of a file using a block based on the block number according to embodiment 2.

DESCRIPTION OF EMBODIMENTS

The preferred embodiments for carrying out the present invention will be described as embodiments 1 and 2.

Now, embodiments 1 and 2 of the present invention will be described with reference to the drawings, taking a computer system having a storage subsystem and a file server as an example. Embodiments 1 and 2 according to the present invention are mere examples for carrying out the present invention, and they are not intended to restrict the technical scope of the present invention.

Embodiment 1

Figure 1:
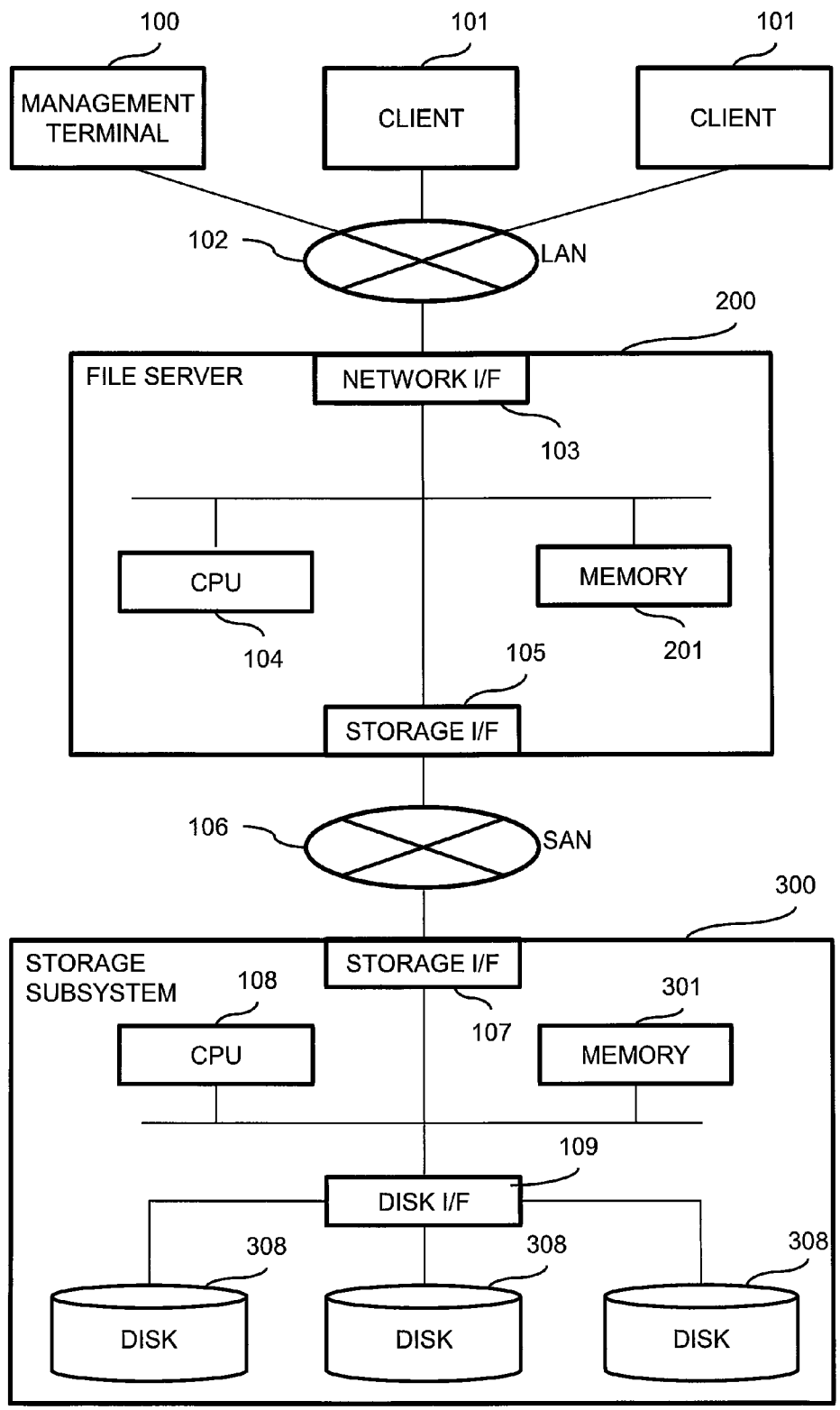
FIG. 1 is a view illustrating a configuration example of a computer system to which the present invention is applied.

FIG. 1 is a block diagram illustrating an outline of the configuration of a computer system to which the present invention is applied. The computer system includes one management terminal 100, two or more client computers 101, at least one file server 200 coupled to the management terminal 100 and the client computers 100 via a LAN 102, and at least one storage subsystem 300 coupled to the file server 200 via a SAN 106.

The management terminal 100 is a computer for managing the file server 200 through use of a management function provided by the file server 200.

The client computers 101 are computers used by users for utilizing a file sharing service provided by the file server 200. Client programs that communicate with the file server are operated for example in the client computers 101.

A LAN 102 is a network for mutually connecting the management terminal 100, the client computers 101 and the file server 200.

The file server 200 is a computer for providing a file sharing service to the end users. The file server 200 is a computer having a network I/F 103 used for the communication between the management terminal 100 and the client computers 101, a CPU 104 for executing programs stored in a memory 201, a storage I/F 105 used for communicating with the storage subsystem 300, and a memory 201 storing programs and data, which are coupled via an internal communication path (such as a bus).

A SAN 106 is a network for mutually connecting the file server 200 and the storage subsystem 300.

The storage subsystem 300 is a system for providing a destination for storing data to the server and an access I/F to the data in block units. The storage subsystem 300 is a system having a the storage I/F 107 used for communicating with the file server 200, a CPU 108 for executing programs stored in the memory 301, a disk 308 for saving data, a disk I/F 109 used for accessing the disk 308, and a memory 301 for storing programs and data, wherein these components are connected via an internal communication path (such as a bus).

Figure 2:
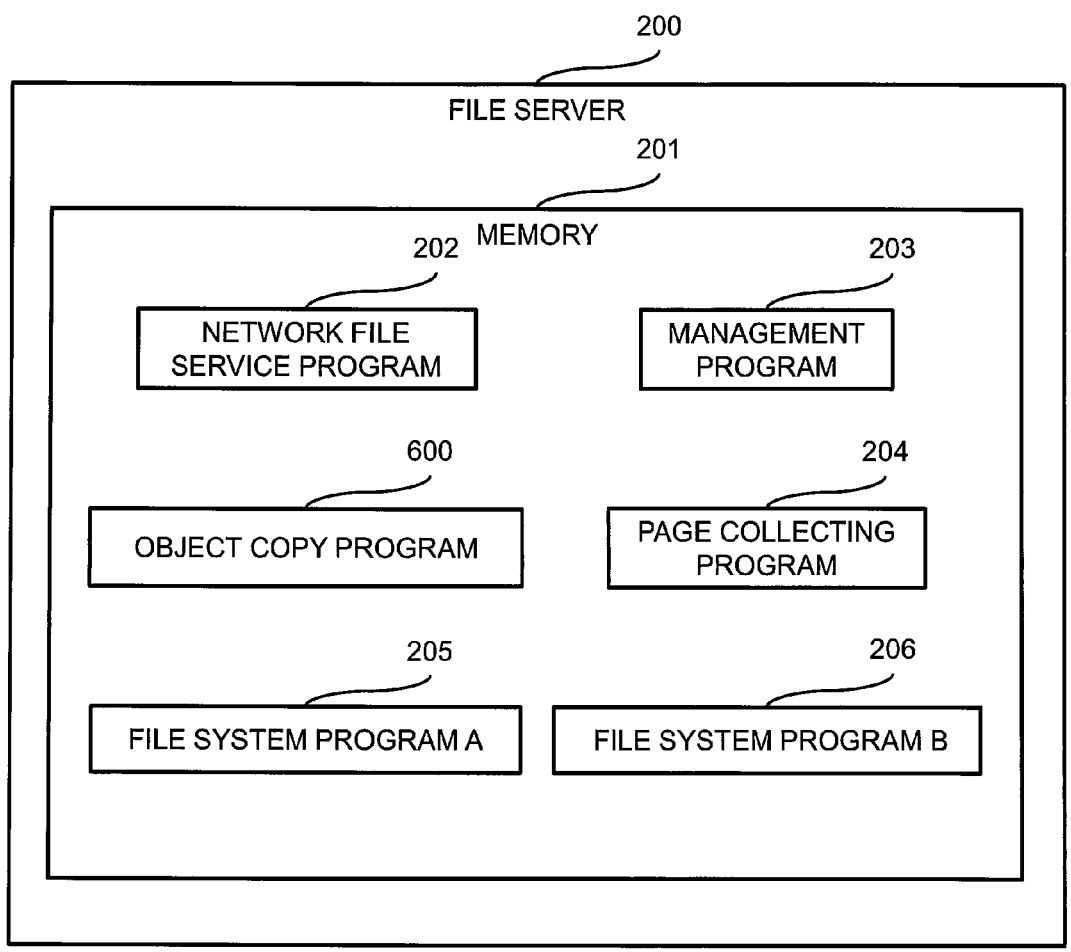
FIG. 2 is a view showing a software configuration example of a file server to which the present invention is applied.

FIG. 2 is a block diagram illustrating an outline of the configuration of programs and data stored in the memory 201 in the file server 200 to which the present invention is applied. The memory 201 stores a network file service program 202, a management program 203, an object copy program 600, a page collecting program 204, a file system program A 205 and a file system program B 206.

The network file service program 202 is a program for providing a file sharing service to end users by releasing a portion or all of the file systems to the client computers 101 as "share". For example, the file sharing service can adopt a CIFS (Common Internet File System) or an NFS (Network File System).

The management program 203 is a program for providing a function for managing the file server to an administrator by providing a management function to the management terminal 100.

The object copy program 600 is a program for copying an object from file system A 311 to file system B 313. The processes and the like executed via the program will be described later with reference to FIG. 6.

The page collecting program 204 is a program for calculating unused pages by acquiring information related to free spaces within the file system, and ordering the storage subsystem 300 to cancel allocation of unused pages. The detailed description regarding pages and the processes performed based on the page collecting program 204 will be described in detail later.

The file system program A 205 is a program for managing the file system A 311 described later stored in the disk 308 within the storage subsystem 300.

The file system program B 206 is a program for managing the file system B 313 described later stored in the disk 308 within the storage subsystem 300.

Figure 3:
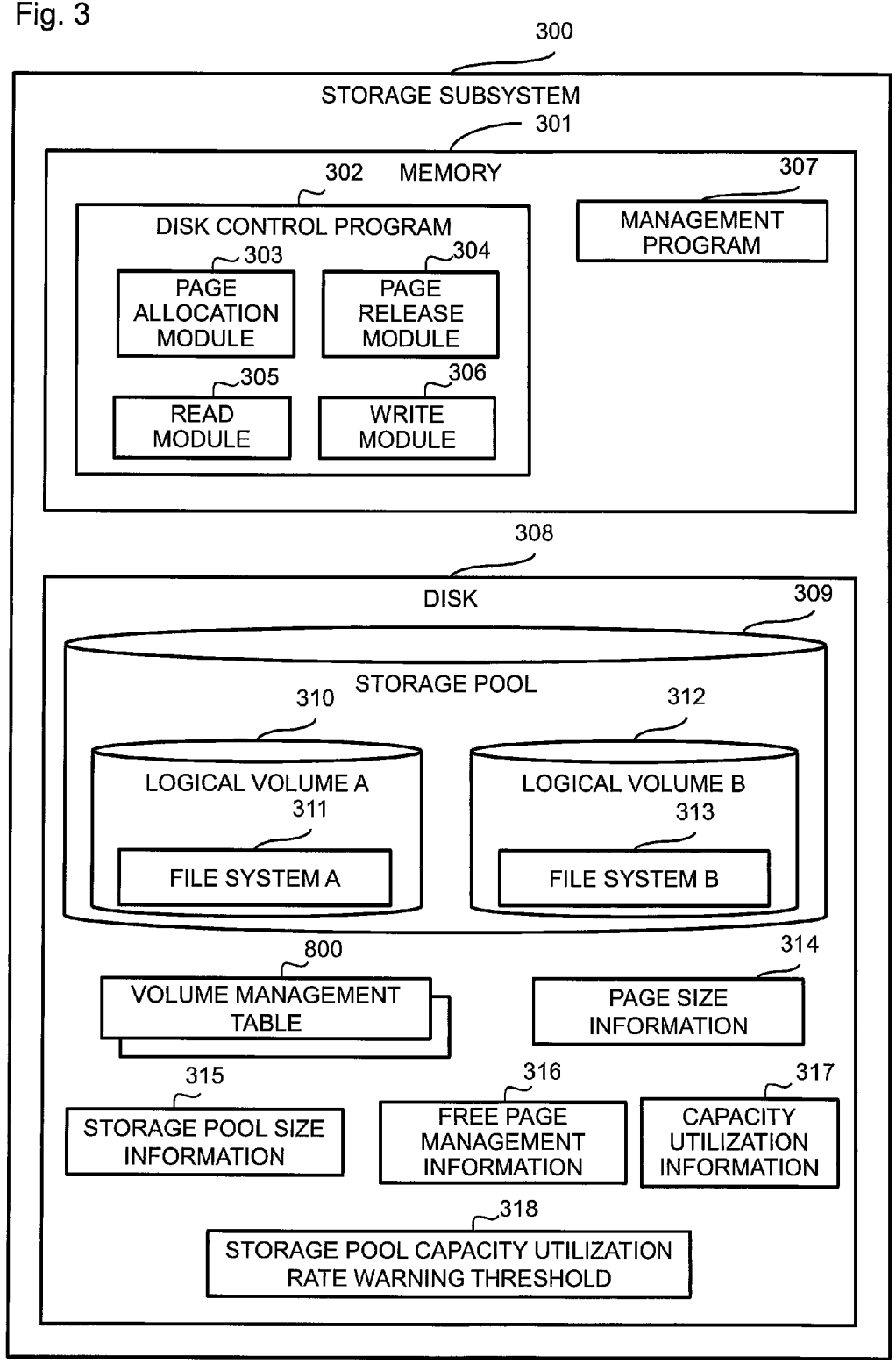
FIG. 3 is a view showing a configuration example of software and data of a storage subsystem to which the present invention is applied.

FIG. 3 is a block diagram illustrating an outline of the configuration of programs and data stored in the memory 301 of the storage subsystem 300 to which the present invention is applied, and an outline of the configuration of data stored in the disk 308 included in the storage subsystem 300 to which the present invention is applied.

The memory 301 stores a disk control program 302 and a management program 307. The disk 308 stores a storage pool 309, a volume management table 800, a page size information 314, a the storage pool size information 315, a free page management information 316, a capacity utilization information 317 and a storage pool capacity utilization rate warning threshold 318.

The disk control program 302 includes a page allocation module 303, a page release module 304, a read module 305 and a write module 306.

The page allocation module 303 triggered by a call from the write module 306 is executed by the CPU 108 of the storage subsystem 300. The page allocation module 303 is a module for allocating pages to a logical volume A 310 or a logical volume B 312 when the write module 306 writes data into the logical volume A 310 or the logical volume B 312 created in the storage pool 309. The page allocation module 303 refers to the free page management information 316, and searches for free pages within the storage pool 309. A page refers to a management unit of storage areas in the storage pool 309 or logical volumes. The area of the storage pool 309 is divided into pages and managed, and the storage areas are allocated to the logical volumes in page units.

The page release module 304 triggered by a call from the page collecting program 204 is executed by the CPU 108 of the storage subsystem 300. The page release module 304 releases the pages allocated to the logical volume A 310 or the logical volume B 312, and sets the pages as free pages. The pages set as free pages can be reallocated to other volumes.

The read module 305 is executed by the CPU 108 of the storage subsystem 300 based on a request from the server. The read module 305 is a module that reads the data retained by the logical volume, and returns the data to the server. The read module refers to the volume management table 800, converts the logical address in the logical volume subjected to a read request from the server to the physical address in the storage pool, and reads data.

The write module 306 is executed by the CPU 108 of the storage subsystem 300 based on a request from the server. The write module 306 is a module for writing data into the logical volume. The write module 306 refers to the volume management table 800, converts the logical address in the logical volume subjected to a write request from the server to the physical address in the storage pool, and writes data. At this time, if a page is not allocated to the area within the logical volume requested by the server, the page allocation module 303 is called to allocate a page.

The management program 307 is a program for providing a management function of the storage subsystem 300 to an administrator of the storage subsystem 300.

The storage pool 309 is a pool provided to the server as a single storage area by integrating the capacities of multiple disks 308 in the storage subsystem 300. At least one logical volume is created in the storage pool 309. The total size of the respective logical volumes created in the storage pool 309 can exceed the size of the storage pool 309. This is because pages are not allocated immediately after creating the logical volume. If a page is not allocated to the address to which the write module 306 attempts to write data, the write module 306 calls the page allocation module 303, and allocates a free page within the storage pool.

The logical volume A 310 is a logical volume created in the storage pool 309, and a file system A 311 is created therein.

The file system A 311 is a migration source file system, which is a file system in which files of end users are stored using the file sharing service provided by the network file service program 202. The file system A 311 is managed by the file system program A 205 stored in the memory 201 of the file server 200.

The logical volume B 312 is a logical volume created in the storage pool 309, in which a file system B 313 is created.

The file system B 313 is a migration destination file system, and the files stored in the file system A 311 are copied thereto. The file system B 313 is managed by the file system program B 206 stored in the memory 201 included in the file server 200.

One volume management table 800 is provided to correspond to each logical volume created in the storage pool 309, for managing the status of allocation of pages to respective logical volumes, and for mapping logical addresses in the logical volumes to physical addresses in the storage pool.

The page size information 314 is information indicating the page size of the storage pool 309.

The storage pool size information 315 is information indicating the size of the storage pool 309.

The free page management information 316 is information for managing pages which are not allocated to any logical volume out of the pages of the storage pool 309.

The capacity utilization information 317 is the size of the storage area being used in the storage areas of the storage pool 300, which is equivalent to the total size of pages being allocated to any one of the logical volumes.

The storage pool capacity utilization rate warning threshold 318 is used to warn that there is little free page left in the storage pool 309. If a quotient obtained by dividing the capacity utilization information 317 by the storage pool size information 315 exceeds the storage pool capacity utilization rate warning threshold 318, a warning is output to the administrator of the storage subsystem 300 via the management program 307.

Figure 4:
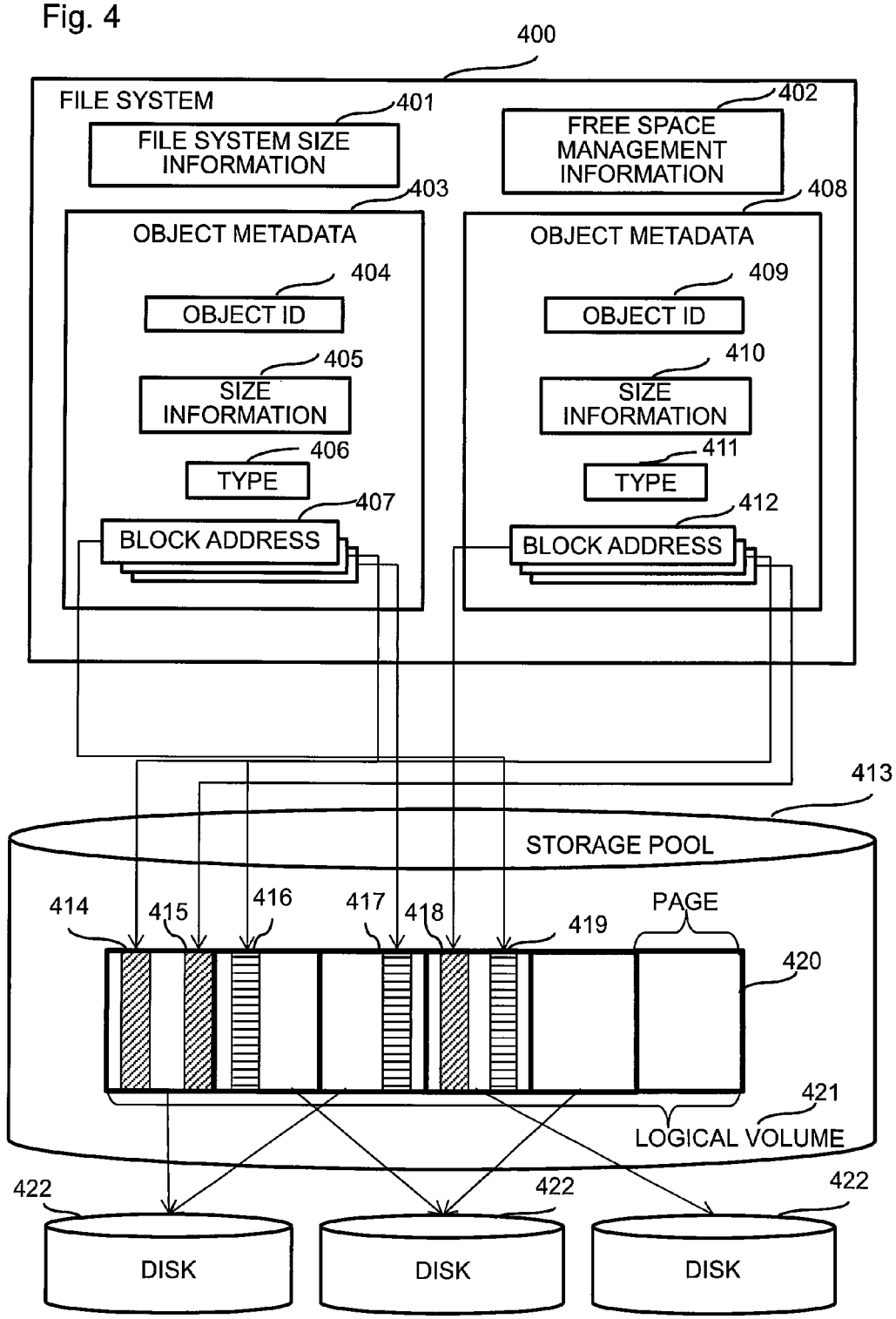
FIG. 4 is a view showing a configuration example of a file system.

FIG. 4 is a view showing an outline of an internal configuration of file system A 311 and file system B 313 as an example of a file system 400.

The file system 400 includes a file system size information 401, a free space management information 402 and object metadata 403 and 408. One object metadata is created for each object. In the present example, two object metadata 403 and 408 are illustrated.

The file system size information 401 is information indicating the size of the file system 400.

The free space management information 402 is information for managing the blocks not used by the file system. The form of the free space management information 402 can be, for example, a bitmap or a B+tree of an extent.

The object metadata 403 and 408 respectively include, as object metadata, object ID 404 or 409, size information 405 or 410, type 406 or 411, and block address 407 or 412.

The object ID 404 or 409 is an ID for uniquely identifying an object from the multiple objects stored within the file system. The method for allocating IDs can adopt allocating close values to file systems within the same directory, or allocating close IDs to files within the same directory.

The size information 405 or 410 is information showing the object sizes.

The type 406 or 411 is information showing that the object is either a file or a directory.

The block address 407 or 412 is information indicating the block in which object data is stored within the logical volume 421. Now, blocks are minimum units for writing or reading data in a storage, wherein one or more blocks are used to retain object data. The page 420 is composed of multiple blocks.

Blocks 414 through 419 are blocks in the logical volume 421. Blocks 414, 415 and 418 retain object data corresponding to object metadata 408. Blocks 416, 417 and 419 retain object data corresponding to object metadata 403.

Blocks 414 and 415 exist in the same page, blocks 418 and 419 exist in the same page, and blocks 416 and 417 exist independently in single pages. As described, there are cases where blocks retaining the data of the same object are dispersed in multiple pages. In FIG. 4, the blocks constituting the object corresponding to object metadata 403 and 408 are dispersed in multiple pages. Moreover, there are cases where blocks retaining data of different objects exist in a single page. In FIG. 4, blocks 419 and 418 which are blocks constituting different objects exist in the same page. Further, a single logical volume is composed of areas from multiple disks 422.

Figure 5:
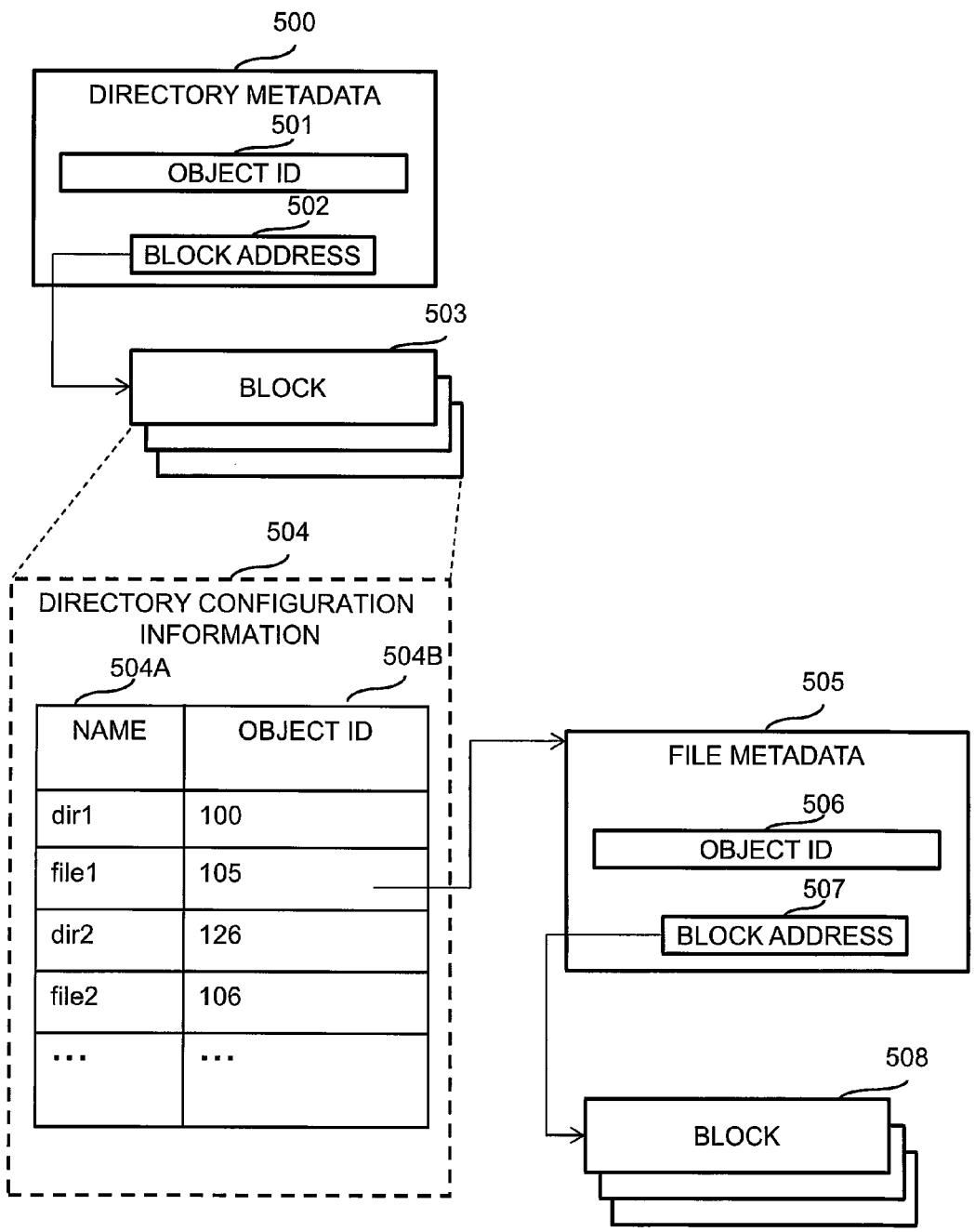
FIG. 5 is a view showing a data configuration example of a directory structure in a file system.

FIG. 5 is a view showing a data configuration example having a directory configuration in the file system.

A directory configuration information 504 retains information on objects stored in the directories. The directory configuration information 504 is stored in a block 503 designated by a block address 502 included in a directory metadata 500. Therefore, in order to acquire the directory configuration information 504, it is necessary to acquire the directory metadata 500 based on an object ID 501 to acquire the block address 502. The directory configuration information can be acquired by reading the block designated by that address.

The directory configuration information 504 is composed of a name 504A and an object ID 504B.

The name 504A is a name of the object stored in the directory.

The object ID 504B is an object ID of the object designated by the name 504A. Based on the object ID, the metadata of the object stored in the directory is acquired.

FIG. 5 illustrates a data configuration for acquiring a file metadata 505 and a block 508 of file 1. The entry of file 1 in the directory configuration information 504 is referred to, and 105 is acquired as the object ID. File metadata is acquired based on this object ID, and the block address 507 stored therein is referred to. By reading the block 508 designated by the block address 507, the data of file 1 can be acquired.

If the directory configuration information of dir1 is to be acquired, the information can be acquired via a process similar to acquiring file 1. The object ID is acquired based on the name of dir1, and the directory metadata is acquired based on this object ID 100. By reading the block designated by the block address stored in the acquired directory metadata, the directory configuration information of dir1 can be acquired.

Figure 6:
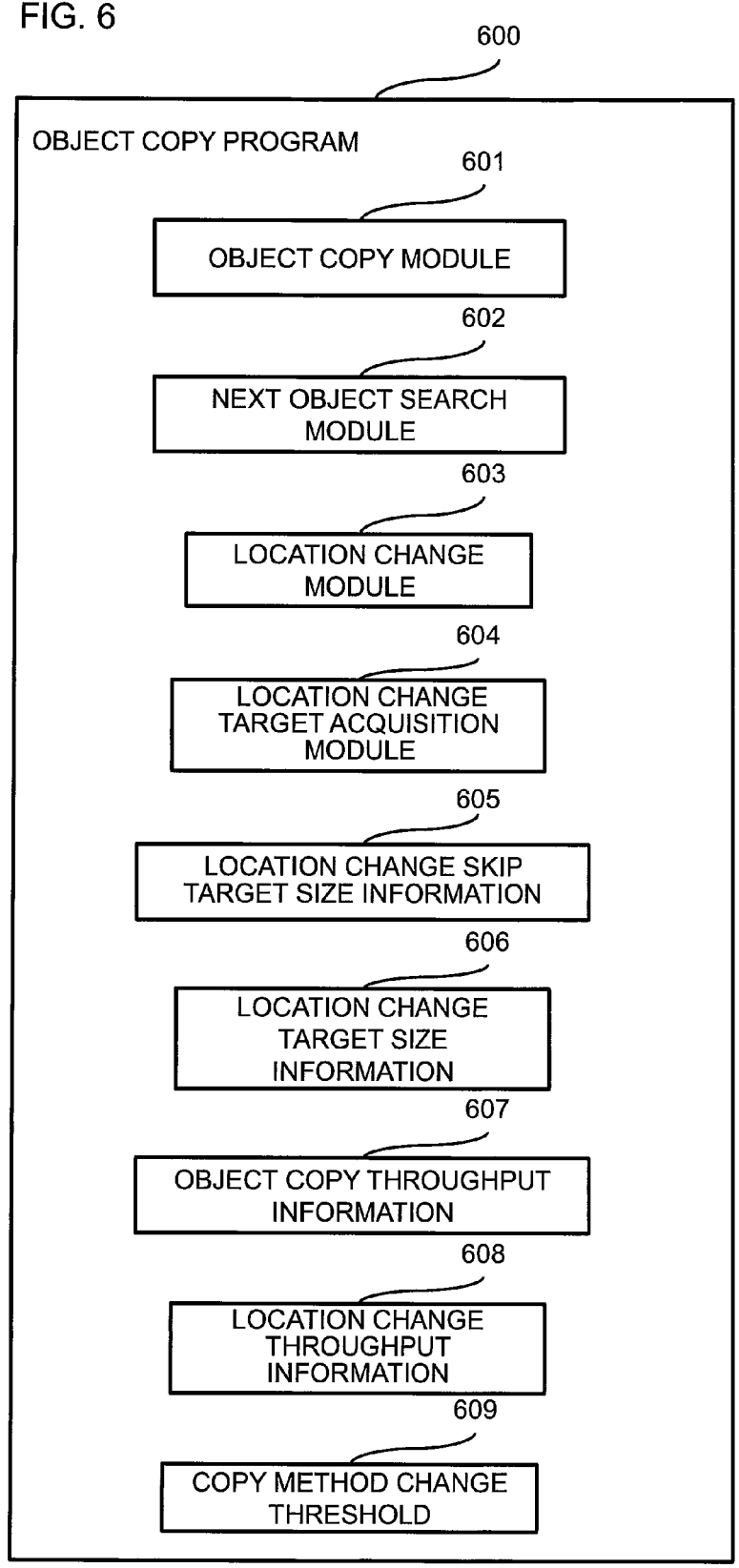
FIG. 6 is a view showing an internal configuration of an object copy program according to embodiment 1.

FIG. 6 is a block diagram illustrating a configuration of functions of the object copy program 600. The object copy program 600 includes an object copy module 601, a next object search module 602, a location change module 603, a location change target acquisition module 604, a location change skip target size information 605, a location change target size information 606, an object copy throughput information 607, a location change throughput information 608 and a copy method change threshold 609.

The object copy module 601 is executed by the CPU 104 of the file server 200 based on an instruction from the administrator via the management program 203 of the file server 200. The object copy module 601 copies the object stored in the file system A 311 to the file system B 313.

The next object search module 602 is executed by the CPU 104 of the file server 200, based on a call from the object copy module 601, the location change target acquisition module 604 or the location change module 603. The next object search module 602 searches an object to be copied or subjected to location change subsequent to the object being designated as an argument, and returns the same to the call source.

The location change module 603 is activated by the object copy module 601 and executed by the CPU 104 of the file server 200. The location change module 603 changes the position of objects within the range acquired by the location change target acquisition module 604 so that objects having similar copy orders are located within the same page if possible.

The location change target acquisition module 604 is executed by the CPU 104 of the file server 200 based on a call from the location change module 603. The location change target acquisition module 604 acquires the range for changing the file location out of the order for copying objects from the file system A 311 to the file system B 313, and returns the same to the call source. Actually, the path name of the object located at a start position of the location change from the copy order and the location change target size information 606 which is a target of the total value of object sizes to be subjected to location change are acquired, and returned to the call source.

The location change skip target size information 605 is information showing the target value of the total size of objects not being the target of location change from the position where copy is completed at the time the location change module 603 is activated, in the order for copying objects from the file system A 311 to the file system B 313. Since the amount shown by the location change skip target size information 605 is not set as the target of location change, it becomes possible to prevent the object being the copy target by the object copy module 601 to correspond to the object being the location change target by the location change module 603, and to prevent execution of unprofitable location change.

The location change skip target size information 605 is referred to from the location change target acquisition module 604, and used for determining the object at the start position of location change. The location change skip target size information 605 can be set via a determination method based on the object copy throughput information 607 and the location change throughput information 608. The details of this method will follow. The location change skip target size information 605 can be set as a given value.

The location change target size information 606 is information showing the target value of the total size of objects whose location is changed via the location change module 603. The location change target size information 606 is referred to from the location change module 603, and used for determining the end of location change. The location change target size information 606 can be determined based on the storage pool size information 315, the capacity utilization information 317 of the storage pool 309, and the storage pool capacity utilization rate warning threshold 318. This method will be described in further detail later. Further, the location change target size information 606 can be set as a given value.

The object copy throughput information 607 is information showing the throughput when the object copy module 601 copies files. The object copy throughput information 607 is updated by the object copy module 601. Further, the object copy throughput information 607 is referred to from the location change target acquisition module 604, and used for determining the location change skip target size information 605.

The location change throughput information 608 is information showing the throughput for changing the location of the object by the location change module 603, which is updated by the location change module 603. Further, the location change throughput information 608 is referred to from the location change target acquisition module 604 and used for determining the location change skip target size information 605.

The copy method change threshold 609 is a threshold for switching copying methods. According to embodiment 1, if the capacity utilization rate of the storage pool (=capacity utilization information 317/storage pool size information 315) exceeds the copy method change threshold 609, the location change target acquisition module 604 is activated. The copy method change threshold 609 is set smaller than a storage capacity utilization rate warning threshold 318, and the copy method should be switched before outputting a warning to the administrator accompanying the increase of the capacity utilization information 317 of the storage pool 309. For example, a value calculated via following expression 1 is set as the copy method change threshold 609.

$$T=W^2 \qquad \text{[Expression 1]}$$

where

T: copy method change threshold 609, and

W: storage pool capacity utilization rate warning threshold 318

Figure 7:
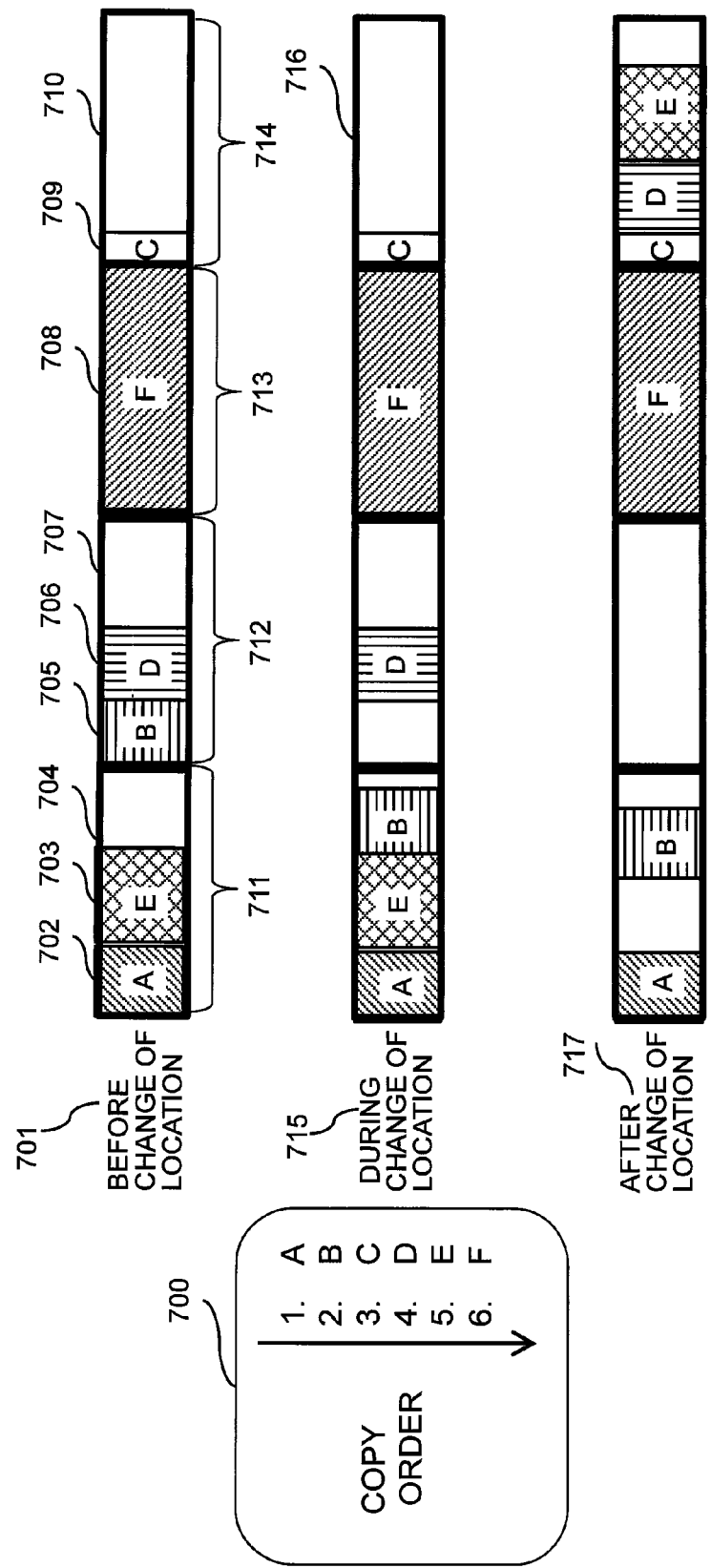
FIG. 7 is a view showing an example of location change of objects according to embodiment 1.

FIG. 7 is a view showing one example of the change of location of objects via the location change module 603. In the location change module 603, the page being the destination of change of location of objects is called a location change destination page.

A copy order 700 lists objects in the range from a location change start position acquired from the location change target acquisition module 604 to where the total size is below the location change target size information 606 out of the order in which the objects are copied via the object copy module 601. In the present example, the object copy module 601 copies objects in the named order: object A 702, object B 705, object C 709, object D 706, object E 703, and object F 708. The location change module 603 also changes the location of objects via a similar order.

Before change of location 701, object A 702 and object E 703 are located in page 711, object B 705 and object D 706 are located in page 712, object F 708 is located in page 713, and object C 709 is located in page 714, respectively. Free spaces 704, 707 and 710 exist before change of location 701.

Before change of location 701, object E 703 exists in page 711 even if object A 702 is copied, so that page 711 cannot be released until object E 703 is copied. Before change of location 701, a page where no object exists will occur only after performing the copying operation to object C 709, and the page can be released.

At first, the location change module 603 sets the location change destination page to page 711 where object A 702 is located. Thereafter, since the location of object B 705 having a copy order next to object A 702 can be located in the free space 704, the location of object B 705 is changed to free space 704. Thereby, the state will be changed to "during change of location 715". The next target to be subjected to location change is the object C 709, but there is no free space for locating the object C 709 in the page 711 which is the location change destination page.

Therefore, the location change module 603 changes the location change destination page to page 714 where the object C 709 is located. Free space 716 exists in page 714. Since the object D 706 having a copy order next to object C 709 can be located in the free space 716, the location of object D 706 is changed to free space 716. Moreover, object E 703 having the next copy order can also be located in the free space of page 714, the location of object E 703 is also changed to free space 716. Now, there will be no more free space in page 714 for allocating the object F 708 having the next copy order.

Next, the location change destination page is changed to the page where object F 708 is located. However, since object F 708 is the end position of change of location, the processing of the location change module 603 is ended.

As a result, a state illustrated in the drawing as after change of location 717 occurs. In the state after change of location 717, since the locations of objects are changed to be collected to one page, there will be no object existing in page 712, so that page 712 can be released immediately. Further, since the location of objects being copied next are changed to be located in the same page, page 711 can be released when object A 702 and object B 705 are copied.

FIG. 8 is a view showing a configuration of the volume management table 800 stored in the storage subsystem to which the present invention is applied. The volume management table 800 constitutes a logical page number 800A, a logical address 800B, a physical device 800C and a physical address 800D as a single entry. A single volume management table 800 is formed to correspond to a single logical volume.

The logical page number 800A is an identifier for uniquely identifying a page within the logical volume.

The logical address 800B is an initial address of a page within the logical volume.

The physical device 800C is an identifier of a device in which the logical page is actually located.

The physical address 800D is an initial address of a page within the physical device.

Regarding the entry where a page has not been allocated, no information is entered in the columns of physical device 800C and physical address 800D.

The page allocation module 303, the page release module 304, the read module 305 and the write module 306 included in the disk control program 302 refers to the volume management table 800, and converts the logical address into a physical address.

Figure 9:
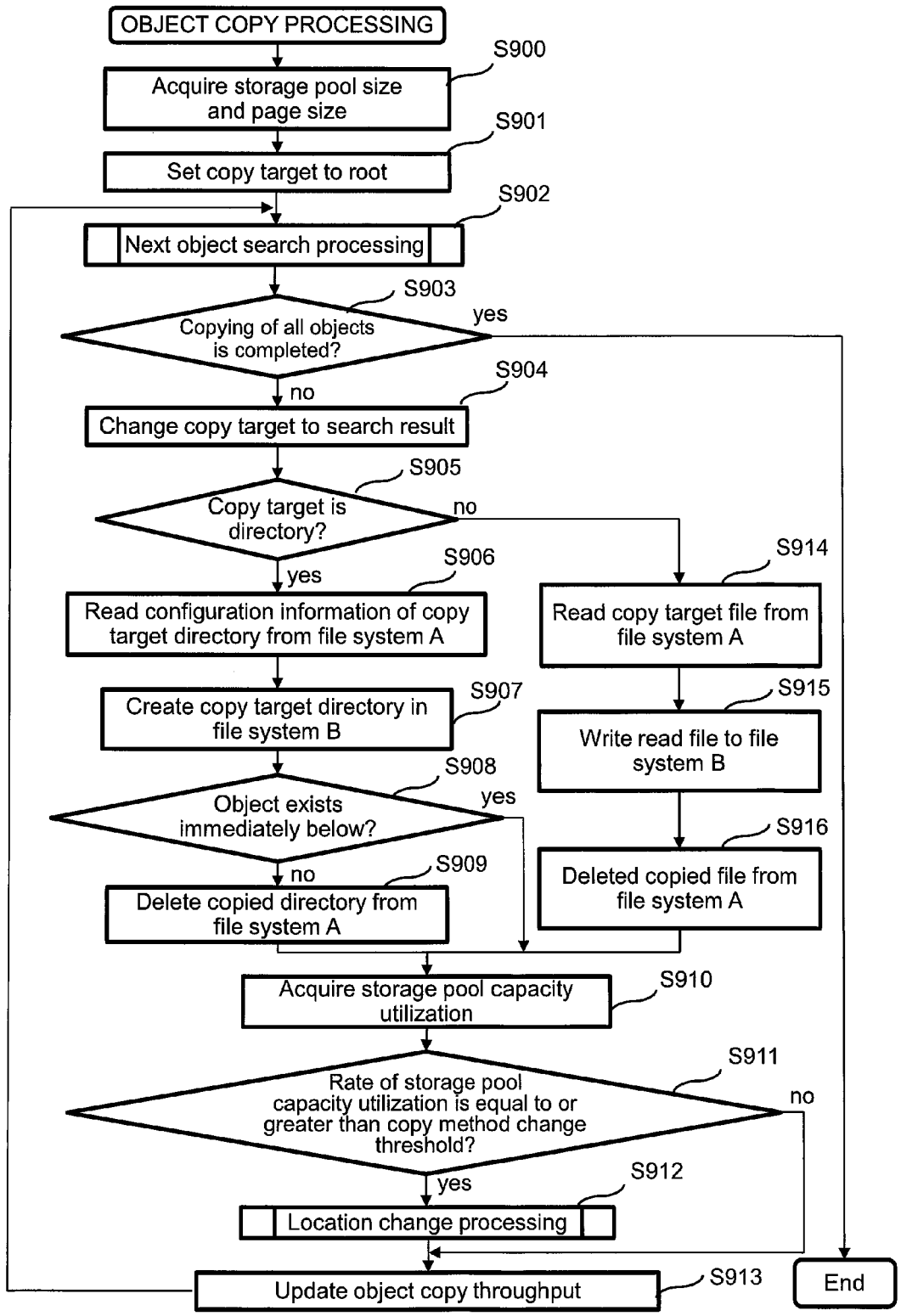
FIG. 9 is a flowchart showing one example of an object copy processing according to embodiment 1.

FIG. 9 is one example of a flowchart for describing the details of an object copy processing executed by the object copy module 601. The object copy module 601 is executed when a command from the administrator is output via the management program 203.

At first, the object copy module 601 acquires the storage pool size information 315 and the page size information 314 (S900).

As an argument of a next object search processing S902, the copy target object is set to a root directory (S901). Thereby, the start position of search of the object being copied will be the root directory.

The next object search processing is called with the currently-set copy target object as the argument, and the object to be copied next is acquired (S902). The details of the next object search processing will be described later with reference to FIG. 10.

Whether a return value of the next object search processing S902 means that copying of all objects have been completed or not is determined (S903).

If the return value of the next object search processing S902 means that copying of all objects have been completed (if S903 is yes), the object copy processing is ended.

If the return value of the next object search processing S902 does not means that copying of all objects have been completed (if S903 is no), the object being returned as a search result from the next object search processing S902 is set as the copy target object (S904).

Next, whether the copy target object is a directory or not is determined (S905).

If the copy target object is not a directory but a file (if S905 is no), the copy target file is read from the file system A 311 via the file system program A 205 (S914). Then, the copy target file having been read is written to the file system B 313 via the file system program B 206 (S915). Thereafter, the copy target file is deleted from the file system A 311 via the file system program A 205 (S916).

On the other hand, if the copy target object is a directory (if S905 is yes), the configuration information of the copy target directory is read from the file system A 311 via the file system program A 205 (S906). Then, the copy target directory is created in the file system B 313 via the file system program B 206 (S907). Thereafter, whether an object exists immediately below the copy target directory in file system A 311 or not is determined (S908). If an object does not exist immediately below the directory (if S908 is no), the copy target directory is deleted from the file system A 311 via the file system program A 205 (S909).

After performing the process of S909 or after performing the process of S916, or when it is determined that an object exists immediately below the directory in S908 (if S908 is yes), the capacity utilization information 317 of the storage pool 309 is acquired (S910).

Thereafter, whether a storage capacity utilization rate P acquired based on the following expression 2 using the capacity utilization information 317 of the storage pool 309 acquired in S910 and the storage pool size information 315 acquired in S900 is equal to or greater than the copy method change threshold 609 stored in the object copy program 600 or not is determined (S911).

If P is equal to or greater than the copy method change threshold 609 (if S911 is yes), a location change processing is started by setting the path name of the copy target object and the page size information 314 acquired in the process of S900 as arguments (S912). Further, the location change processing can be executed simultaneously as the object copy processing by executing the processing via a thread that differs from the object copy processing, so that it becomes possible to prevent the object copy processing from being stopped. In this case, it is not necessary for the object copy processing to wait for the location change processing to end. The location change processing will be described later with reference to FIG. 11.

The storage capacity utilization rate P will be calculated by the following Expression 2.

$$P = C/S \times 100 \qquad \text{[Expression 2]}$$

where
  P: storage capacity utilization rate,
  C: capacity utilization information 317 of storage pool 309, and
  S: storage pool size information 315.

After completing the location change processing (S912), or when it is determined in the process of S911 that the value of P falls below the copy method change threshold 609 (if S911 is no), the time required for copying the object and the size of the copied object are acquired and the object copy throughput information 607 is updated (S913), before the procedure returns to the next object search processing (S902).

Figure 10:
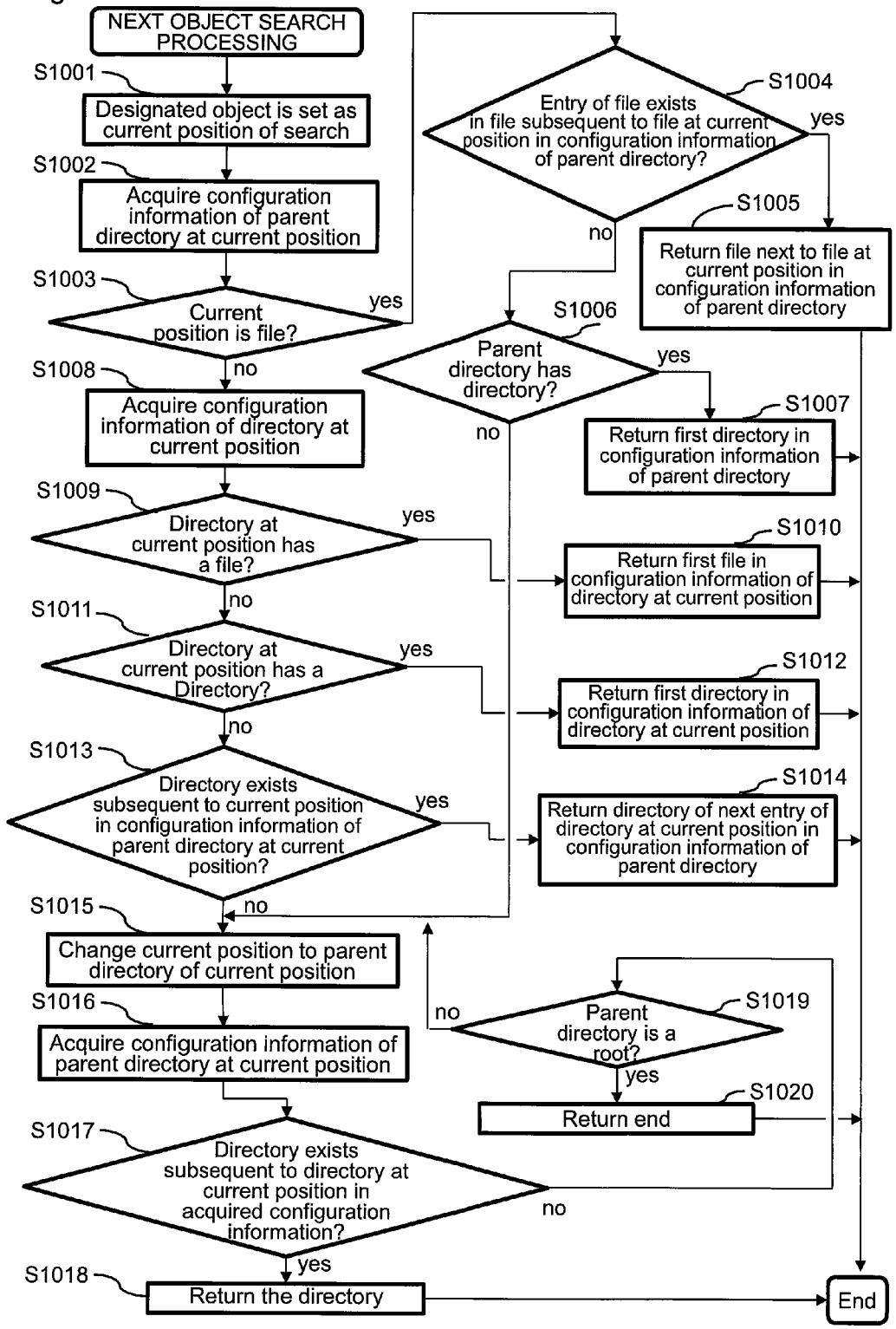
FIG. 10 is a flowchart showing one example of a next object search processing according to embodiments 1 and 2.

FIG. 10 shows one example of a flowchart for describing the details of the next object search processing executed by the next object search module 602. The next object search module 602 is executed by a call from the file object copy module 601, a call from the location change target acquisition module 604, and a call from the location change module 603.

FIG. 10 shows an example of a search algorithm used in the next object search processing for seeking the object to be copied next. The algorithm of FIG. 10 searches files within the object included in the directory, and after searching all the files, it searches directories. The algorithm of FIG. 10 targets a file system having a property that files within the same directory are located at close locations within the logical volume, and by utilizing this property, the algorithm copies and deletes files per each directory. Based on this algorithm, the possibility of immediately copying and deleting files within the same page can be improved. Various search algorithms can be adopted as the next object search processing, such as a depth-prioritized search or a width-prioritized search.

At first, the object designated as the argument is set as the current position of search (S1001).

The configuration information of the parent directory of the object at the current position is acquired from the file system A 311 (S1002).

The metadata of the object at the current position is acquired via the file system program A 205, the type 406 included in the metadata is referred to, and it is determined whether the current position is a file or not (S1003).

If the current position is a file (if S1003 is yes), procedure refers to the configuration information of the parent directory of the file at the current position, and whether an entry of a file exists or not in the entries subsequent to the file at the current position is determined (S1004).

If an entry of a file exists (if S1004 is yes), the process is ended by returning a path name of the next file of the file at the current position in the entry of the configuration information of a parent directory to the call source (S1005). At this time, in order to determine whether the object retained in the configuration information of the directory is a file or a directory, the metadata of each object is read from the file system A 311 via the file system program A 205, and type 406 included in the metadata is referred to.

If an entry of a file does not exist (if S1004 is no), the configuration of the parent directory of the file at the current position is referred to, and whether the parent directory of the file at the current position has a directory or not is determined.

If the parent directory includes a directory (if S1006 is yes), the process is ended by returning the path name of the first directory included in the entry of the configuration information of the parent directory to the call source (S1007). At this time, in order to determine whether the directory includes a directory or not, the metadata of each object that the directory has is read from the file system A 311 via the file system program A 205, and the type 406 that the metadata has is referred to.

If the parent directory does not have a directory (if S1006 is no), the current position is changed to the parent directory of the current position, and the search position is changed to the parent directory (S1015).

In S1003, if the current position is a directory and not a file (if S1003 is no), the configuration information of the directory at the current position is acquired from the file system A 311 via the file system program A 205 (S1008).

Next, the configuration information of the directory at the current position is referred to, and whether the directory at the current position has a file or not is determined (S1009).

If the directory at the current position includes a file (if S1009 is yes), the process is ended by returning the path name of the first file within the entry of the configuration information of the directory at the current position to the call source (S1010).

If the directory at the current position does not have a file (if S1009 is no), the configuration information of the directory at the current position is referred to, and whether the directory at the current position includes a directory or not is determined (S1011).

If the directory at the current position includes a directory (if S1011 is yes), the process is ended by returning the path name of the first directory within the entry of the configuration information of the directory at the current position to the call source (S1012).

If the directory at the current position does not have a directory (if S1011 is no), the configuration information of a parent directory of the directory at the current position is referred to, and whether the entry of a directory exist or not in the entries subsequent to the directory at the current position is determined (S1013).

If an entry of such directory exists (if S1013 is yes), the process is ended by returning the path name of the directory subsequent to the directory at the current position in the entry of the configuration information of the parent directory to the call source (S1014).

If an entry of that directory does not exist (if S1013 is no), the current position is changed to the parent directory at the current position, and the search position is changed to the parent directory (S1015).

Thereafter, the configuration information of the parent directory at the current position is acquired from the file system A 311 (S1016). The acquired configuration information of the parent directory at the current position is referred to, so as to determine whether an entry of a directory exists or not in the entry subsequent to the directory at the current position (S1017).

If an entry of such directory exists (if S1017 is yes), the process is ended by returning the path name of the directory subsequent to the directory at the current position in the entry of the configuration information of the parent directory to the call source (S1018).

If an entry of such directory does not exist (if S1017 is no), then whether the parent directory of the current position is a root directory or not is determined (S1019).

If the parent directory of the current position is a root directory (if S1019 is yes), the process is ended by returning information indicating that the search has ended to the call source (S1020). If the parent directory at the current position is not a root directory (if S1019 is no), the procedure returns to S1015, changes the current position to the parent directory at the current position, and changes the search position to that parent directory.

Figure 11:
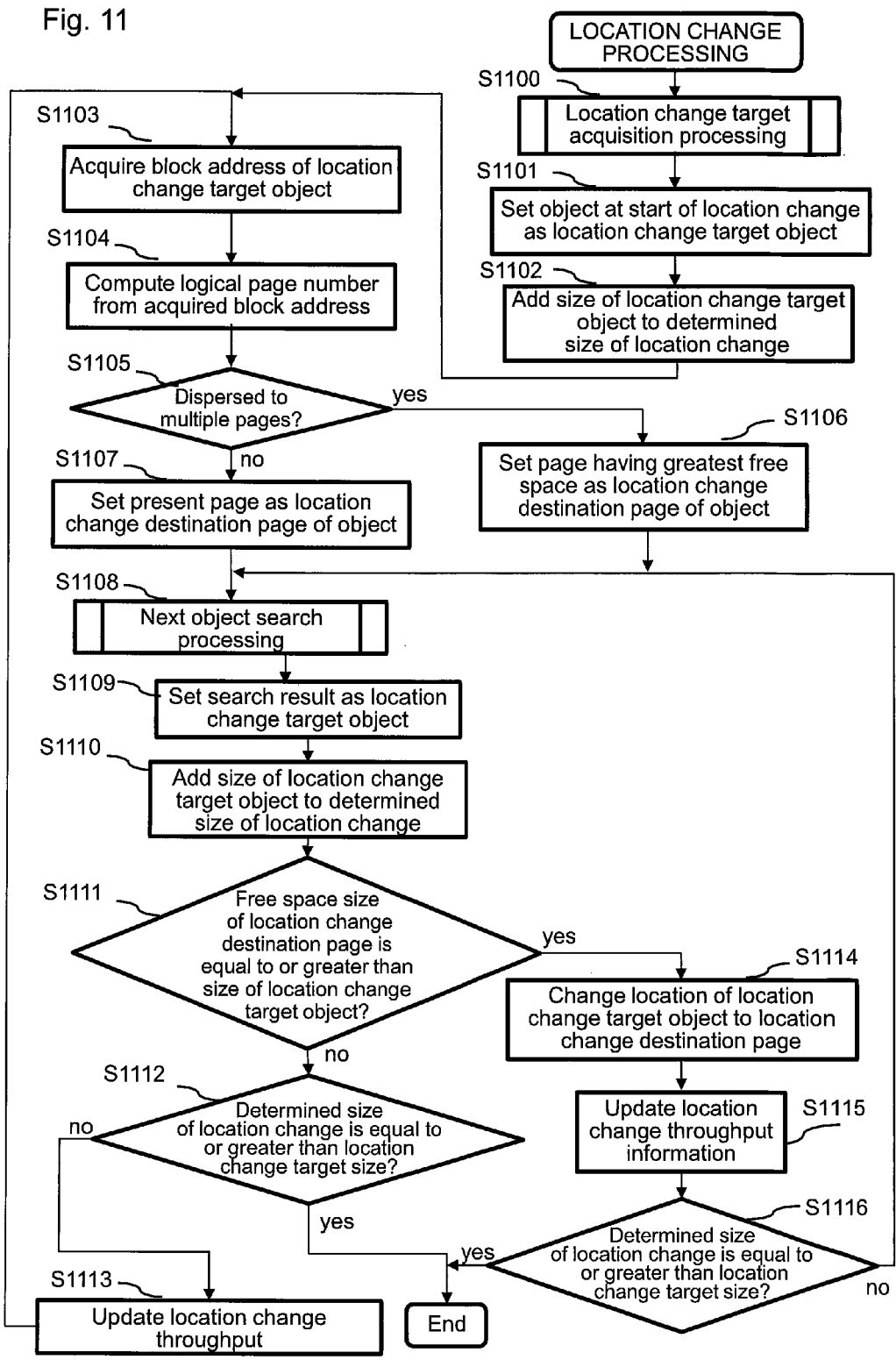
FIG. 11 is a flowchart showing one example of a location change processing according to embodiment 1.

FIG. 11 shows one example of a flowchart for describing in detail the location change processing executed by the location change module 603. The location change module 603 is executed by being activated by the object copy module 601.

At first, a location change target acquisition processing is called, setting the file designated by the object copy module 601 as the argument (S1100). The details of the location change target acquisition processing will be described later with reference to FIG. 12, but based on this processing, it becomes possible to acquire the range of objects being the target of location change from the order in which the object copy module 601 copies files. The return value of the location change target acquisition processing is the path name of the object at the start position of the location change and the location change target size information 606.

The object at the start position of location change received via the location change target acquisition processing is set as the location change target object (S1101). The location change target object refers to the object whose location is currently being changed via the location change processing.

The size of the set location change target object is added to a determined size of location change (S1102).

Next, the metadata of the location change target object is read from the file system A 311 via the file system program A 205, and the block address 407 is acquired from the metadata (S1103).

A logical page number is calculated from the acquired block address (S1104). The logical page number is computed by the following Expression 3. If there are multiple block addresses, the logical page number is computed for all the block addresses.

$$LPN = Baddr/Spage \qquad \text{[Expression 3]}$$

where
  LPN: logical page number,
  Baddr: block address, and
  Spage: page size information 314.

Whether the blocks of the location change target object are dispersed in multiple pages or not is determined as a result of computing the logical page number (S1105).

If the blocks of the location change target object are dispersed in multiple pages (if S1105 is yes), the free spaces within the respective pages are calculated, and the page having the greatest free space is set as the location change destination page of the object (S1106). The free space of a page can be acquired by applying Expression 3 to the block address of the block being managed as free space in the free space management information 402, and by computing in which page the blocks exist as free spaces.

If the blocks of the location change target object are not dispersed in multiple pages, that is, if all blocks constituting the location change target object are located in a single page (if S1105 is no), the only single page where the location change target object is located is set as the location change destination page of the object (S1107).

If the location change destination page of an object is set by the processes of S1106 or S1107, the next object search processing (FIG. 10) is called, setting the path name of the location change target object as the argument (S1108). Based on this process, the path name of the object subjected to location change to the location change destination page is acquired.

The object returned as the return value of the next object search processing is set as the location change target object (S1109).

The size of the set location change target object is added to the determined size of location change (S1110).

Whether or not the size of the free space of the location change destination page is equal to or greater than the size of the location change target object or not is determined (S1111). If the size of the free space in the destination page is equal to or greater than the size of the location change target object (if S1111 is yes), the location of the location change target object is changed to the location change destination page (S1114). As a process for changing the location, at first, the data of the location change target object is copied to the free space of the location change destination page. Thereafter, the block address 407 included in the metadata of the location change target object is rewritten to the block address of the copy destination. Finally, the free space management information 402 is updated so that the location change target object can manage the block as free space prior to change of location.

Next, the location change throughput information 608 is updated (S1115).

Thereafter, whether the determined size of location change is equal to or greater than the location change target size or not is determined (S1116). If the determined size of location change is equal to or greater than the location change target size (if S1116 is yes), the process is ended. If the determined size of location change is smaller than the location change target size (if S1116 is no), the process is returned to S1108, and an attempt to further change the location of an object to the location change destination page is performed.

Based on the determination of S1111, if the size of the free space of the location change destination page is smaller than the size of the location change target object (if S1111 is no), whether the determined size of location change is equal to or greater than a location change target size or not is determined (S1112).

If the determined size of location change is equal to or greater than the location change target size (if S1112 is yes), the process is ended. If the determined size of location change is smaller than the location change target size (if S1112 is no), the location change throughput information 608 is updated (S1113), the process is returned to S1103, and the procedure attempts to change the allocation of an object to the page where the location change target object is located.

Figure 12:
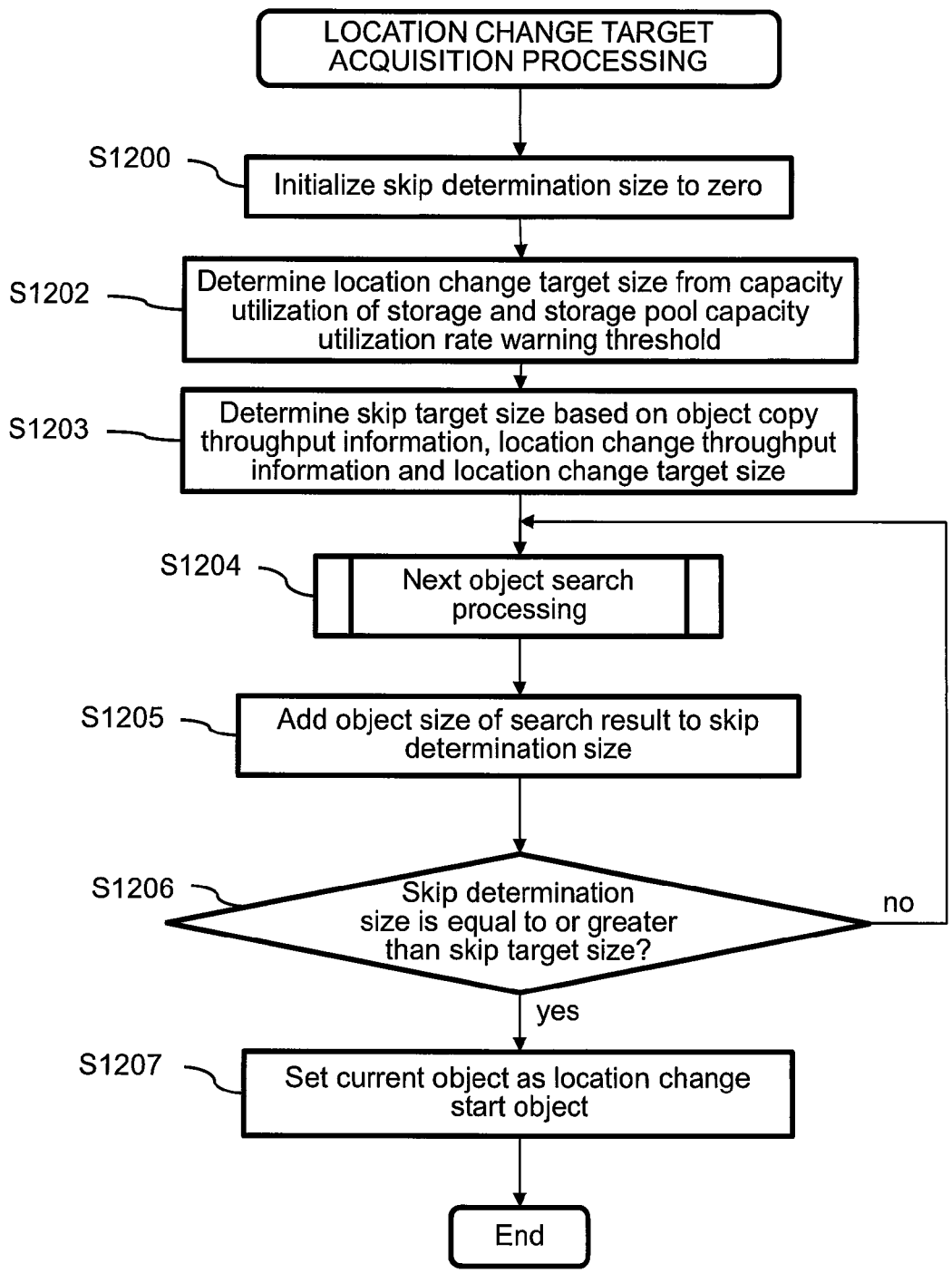
FIG. 12 is a flowchart showing one example of a location change target acquisition processing according to embodiment 1.

FIG. 12 shows one example of a flowchart for describing the details of location change target acquisition processing executed by the location change target acquisition module 604. The location change target acquisition module 604 is executed based on a call from the location change module 603.

At first, a skip determination size is initialized to zero (S1200).

The capacity utilization information 317 and the storage pool capacity utilization rate warning threshold 318 of the storage pool 309 are acquired, and the location change target size 606 is determined (S1202). The location change target size 606 is determined so that it is greater than the value of (capacity utilization information 317 of storage pool 309–storage pool size information 315×copy method change threshold 609).

For example, if the copy method change threshold 609 has been determined based on the above-mentioned Expression 1, the location change target size 606 will be determined as described in the following Expression 4. Further, the object copy throughput information 607 and the location change throughput information 608 can be taken into consideration as described in the following Expression 5. It is also possible to consider the increase of capacity utilization information 317 of the storage pool 309 by coping objects during location change, and to determine the location change target size 606 to be increased in correspondence to the amount of increase thereof. Of course, the location change target size 606 can be determined based on a set value, without performing calculation during the location change target acquisition processing.

$$Rg = C - (S \times W^3) \quad \text{[Expression 4]}$$

where
Rg: location change target size 606,
C: capacity utilization 317 of storage pool,
S: storage pool size information 315, and
W: storage pool capacity utilization rate warning threshold 318.

$$tmp = C - (S \times W^3)$$

$$Rg = tmp + (tmp/TPr) \times TPc \quad \text{[Expression 5]}$$

where
Rg: location change target size 606,
C: capacity utilization 317 of storage pool,
S: storage pool size information 315,
W: storage pool capacity utilization rate warning threshold 318,
TPc: object copy throughput information 607, and
TPr: location change throughput information 608.

Next, the location change skip target size information 605 is determined based on the object copy throughput information 607, the location change throughput information 608 and the location change target size information 606 (S1203). The location change skip target size information 605 must be set so that the object being the target of location change will not be set as the copy target of the object copy module 601 during change of location via the location change module.

For example, the location change skip target size information 605 is determined as shown in the following Expression 6. Of course, the location change skip target size information 605 can be determined by setting a given value, without performing calculation during the location change target acquisition processing.

When $TPc > TPr$, $$SKg = Rg/TPr \times (TPc - TPr)$$

When $TPc \leq TPr$, $$SKg = 0 \quad \text{[Expression 6]}$$

where
SKg: location change skip target size information 605,
Rg: location change target size 606,
TPc: object copy throughput information 607, and
TPr: location change throughput information 608.

The information on the object copied immediately in advance and received as argument is set as an argument when the next object search processing (FIG. 10) is called, and the information of the object corresponding to the next copy order is acquired (S1204).

The size of the object as the result of the search via the next object search processing (S1204) is added to the skip determination size (S1205).

Next, whether the skip determination size is equal to or greater than the location change skip target size information 605 or not is determined (S1206).

If the skip determination size is smaller than the location change skip target size information 605 (if S1206 is no), the procedure returns to the process of S1204.

If the skip determination size is equal to or greater than the location change skip target size information 605 (if S1206 is yes), the object acquired via the next object search processing (S1204) is set as the start position of the location change (S1207).

Figure 13:
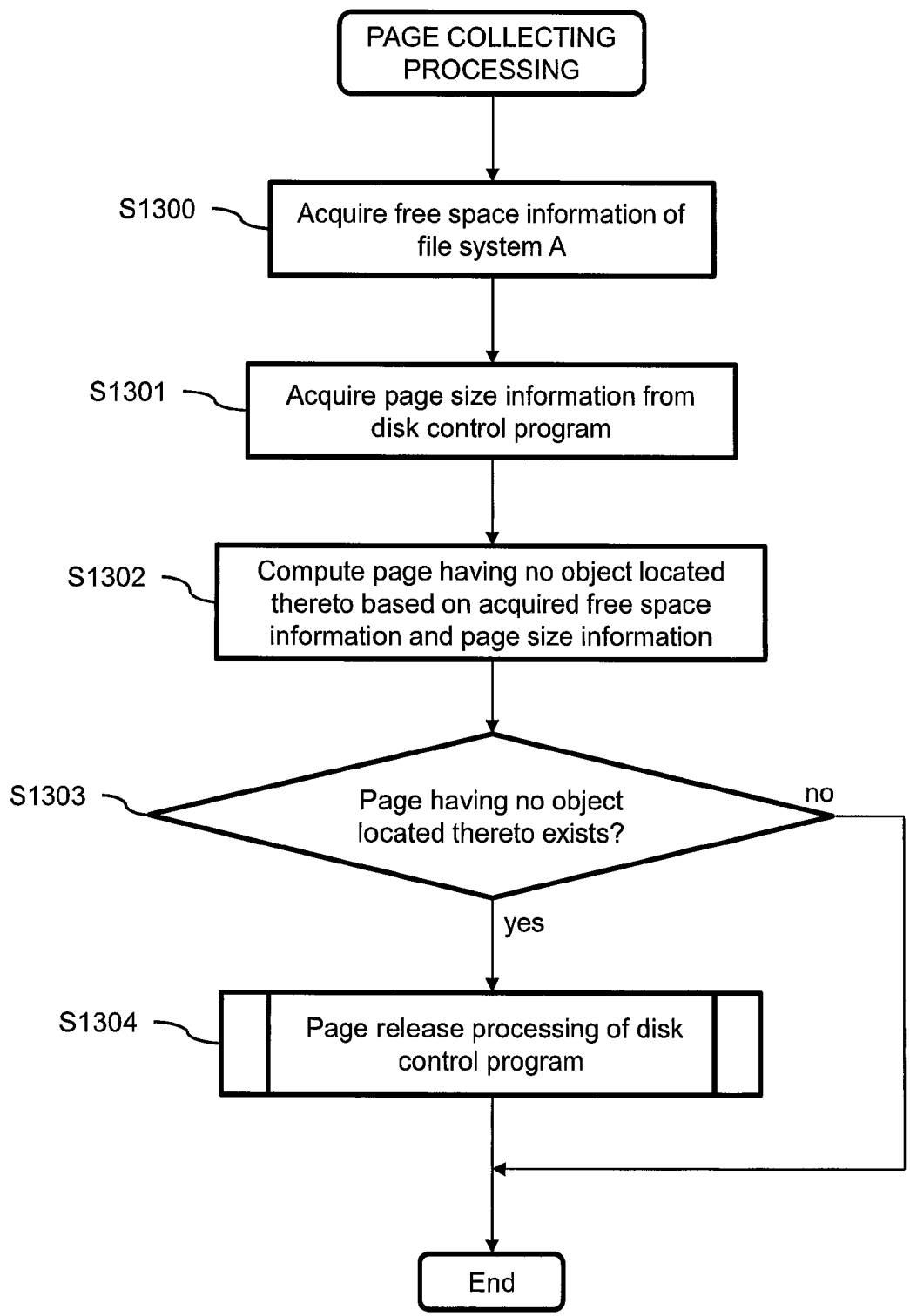
FIG. 13 is a view showing one example of a page collecting processing according to embodiments 1 and 2.

FIG. 13 is an example of a flowchart for describing the details of a page collecting processing executed by the page collecting program 204. The page collecting program 204 operates independently from other programs such as the object copy program 600, and is executed periodically. For example, the timing for executing the page collecting program 204 can be when objects equal to or greater than a certain amount are copied after the previous execution of a program, or when a given amount of time or longer has elapsed from the previous execution of the program.

At first, the free space management information 402 of the file system A 311 is acquired via the file system program A 205 (S1300).

The page size information 314 that the storage subsystem 300 has is acquired from the disk control program 302 (S1301).

The logical page number of the page having no objects located thereto is calculated based on the free space information acquired via the process of S1300 and the page size information 314 acquired via the process of S1301 (S1302). The logical page number is calculated using the former Expression 3, and an area is searched where an area corresponding to a single page is unused and where an object is not located.

Thereafter, whether a page having no object located therein exists or not is determined (S1303). If there is no page without an object (if S1303 is no), the process is ended.

If there is a page without an object located therein (if S1303 is yes), the procedure calls the page release module 304 of the disk control program 302 by setting the logical page number and the logical volume of the page having no object located thereto as arguments, and releases the page (S1304). What is meant by releasing a page is that the volume management table 800 and the free page management information 316 of the storage subsystem 300 are updated so that the allocation of a page to the logical volume is canceled and the page will be managed as a free page. This process is performed by the page release module 304, and the details of the page release processing will be described later with reference to FIG. 15.

Figure 14:
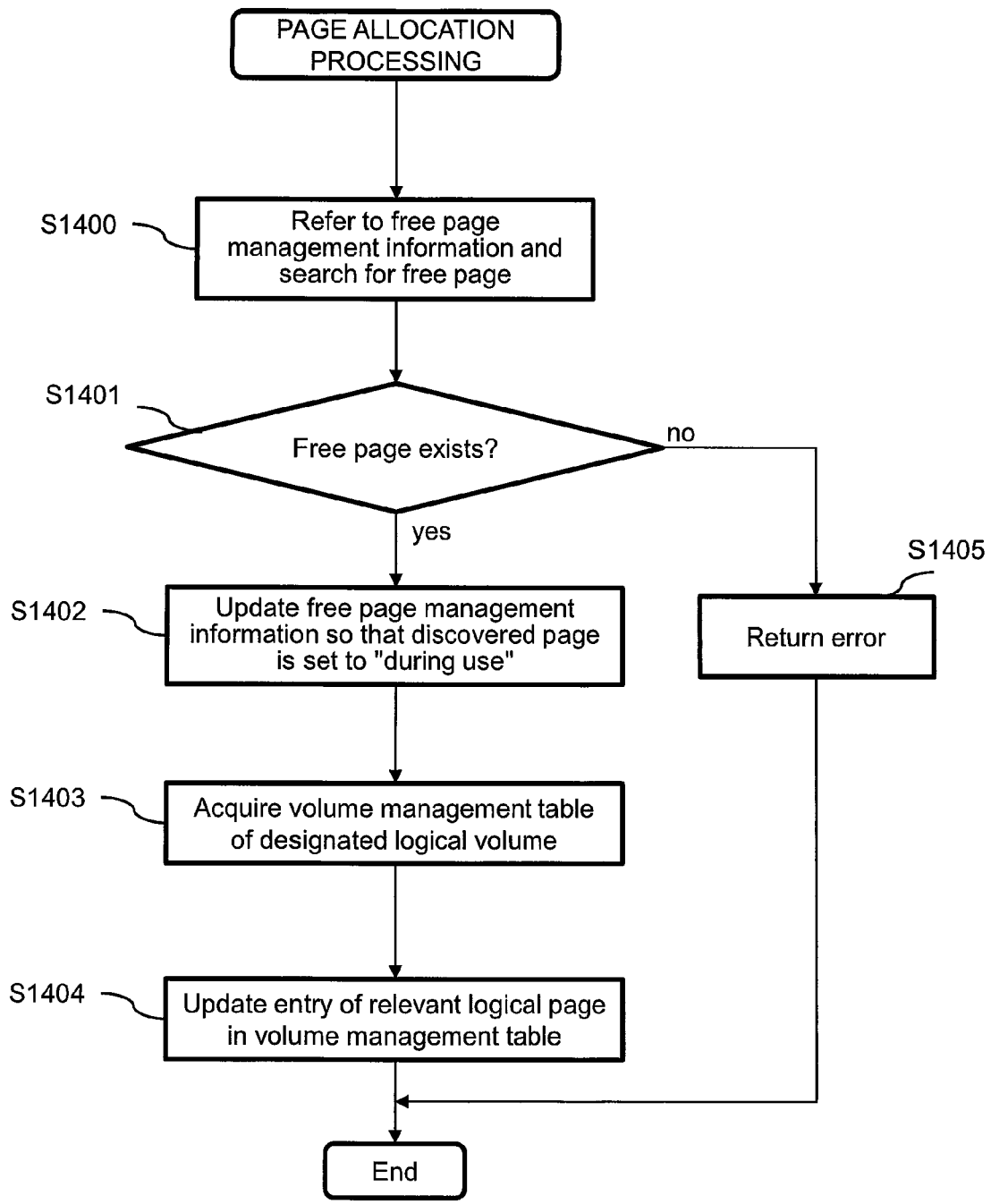
FIG. 14 is a view showing one example of a page allocation processing according to embodiments 1 and 2.

FIG. 14 shows one example of a flowchart for describing the details of a page allocation processing executed by the page allocation module 303. The page allocation module 303 is executed based on a call from the write module 306.

At first, the free page management information 316 that the storage subsystem 300 has is referred to, and a free page is searched (S1400).

As a result of the search, the module determines whether a free page exists or not (S1401). If a free page does not exist (if S1401 is no), the module returns an error and ends the process.

If a free page exists (if S1401 is yes), the module updates the free page management information 316 so that the discovered page is set to "during use" (S1402).

The volume management table 800 of the logical volume designated by the argument is acquired (S1403).

In the acquired volume management table 800, the physical device information 800C in which the allocated page exists and the initial address (physical address) 800D of the page within the physical device are updated in the entry of the logical page designated by the argument (S1404), and the process is ended.

Figure 15:
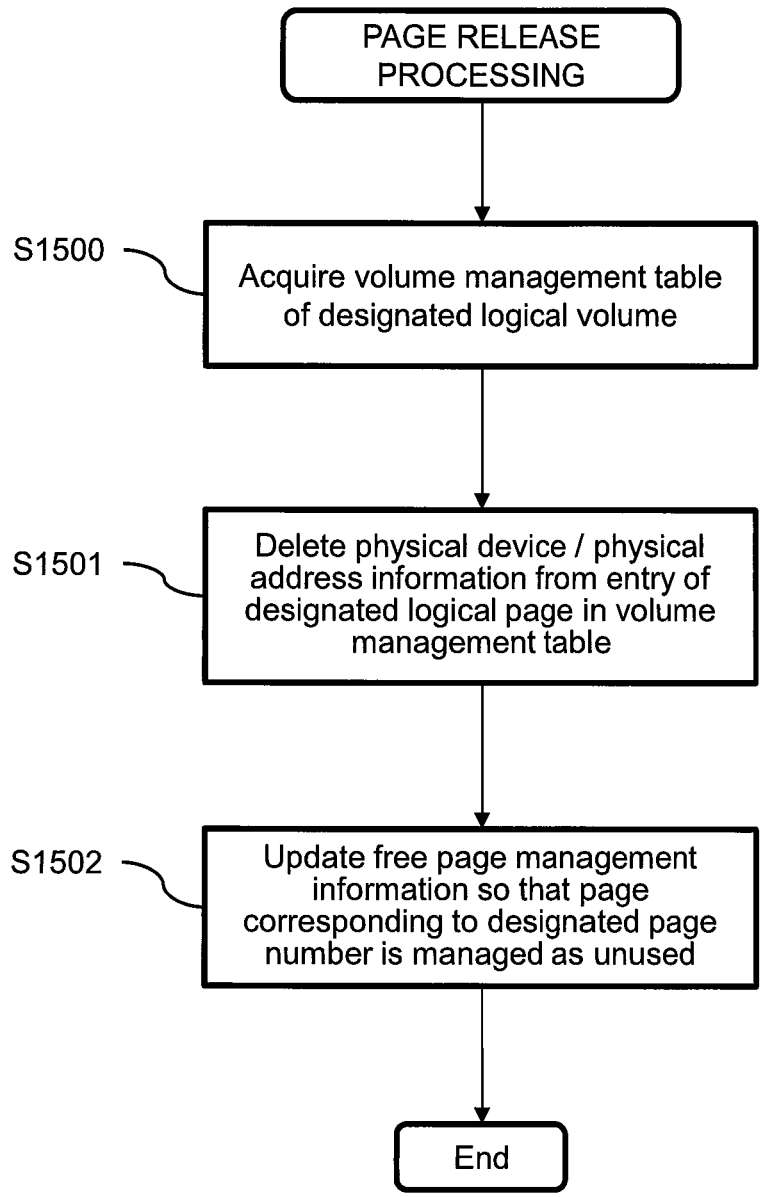
FIG. 15 is a view showing one example of a page release processing according to embodiments 1 and 2.

FIG. 15 is a page release processing executed by the page release module 304. The page release module 304 is executed when called by the page collecting program 204.

At first, the volume management table 800 of the logical volume designated by the argument is acquired (S1500).

In the acquired volume management table 800, the physical device information 800C and the initial address (physical address) 800D of the page within the physical device are deleted from the entry of the logical page designated by the argument (S1501).

The free page management information 316 is updated so that the page allocated to the designated logical page number is managed as a free page (S1502).

As described, according to present embodiment 1, in migrating a file system by copying objects, the location of the object to be copied next is changed so that it is located within the same page, and the objects within the same page can be copied successively. Accordingly, that the page is released immediately after deleting the copied objects.

Embodiment 2

Next, the second embodiment of the present invention will be described. Now, mainly the differences with embodiment 1 are described, and the descriptions related to features that are equivalent to embodiment 1 are either omitted or simplified.

According to embodiment 2, a reverse index table for seeking objects using a certain block is created with the aim to solve or prevent objects from remaining within the page when the capacity utilization information 317 of the storage pool 309 increases above the copy method change threshold 609, and objects are copied in page units using this table.

According to embodiment 2, the retention of objects within a page can be solved or prevented without fail, though the cost for creating a reverse index table is high. If the number of objects remaining in pages is small, the cost related to creating a reverse index table will be small, and it is preferable to adopt present embodiment 2. However, if there are a large number of objects remaining in pages, and the cost for creating a reverse index table is high, it is preferable to adopt embodiment 1 that requires lower costs.

It is also possible to adopt a method to utilize embodiment 2 if objects remain in pages and the pages cannot be released simply by adopting embodiment 1.

The configuration of the computer system according to embodiment 2 is the same as the configuration of the computer system according to embodiment 1 illustrated in FIG. 1. However, the processing contents of the object copy program differ according to embodiment 2. Therefore, according to embodiment 2, the object copy program 600 stored in the memory 201 of the file server 200 according to embodiment 1 is set as an object copy program 1600 described below.

Figure 16:
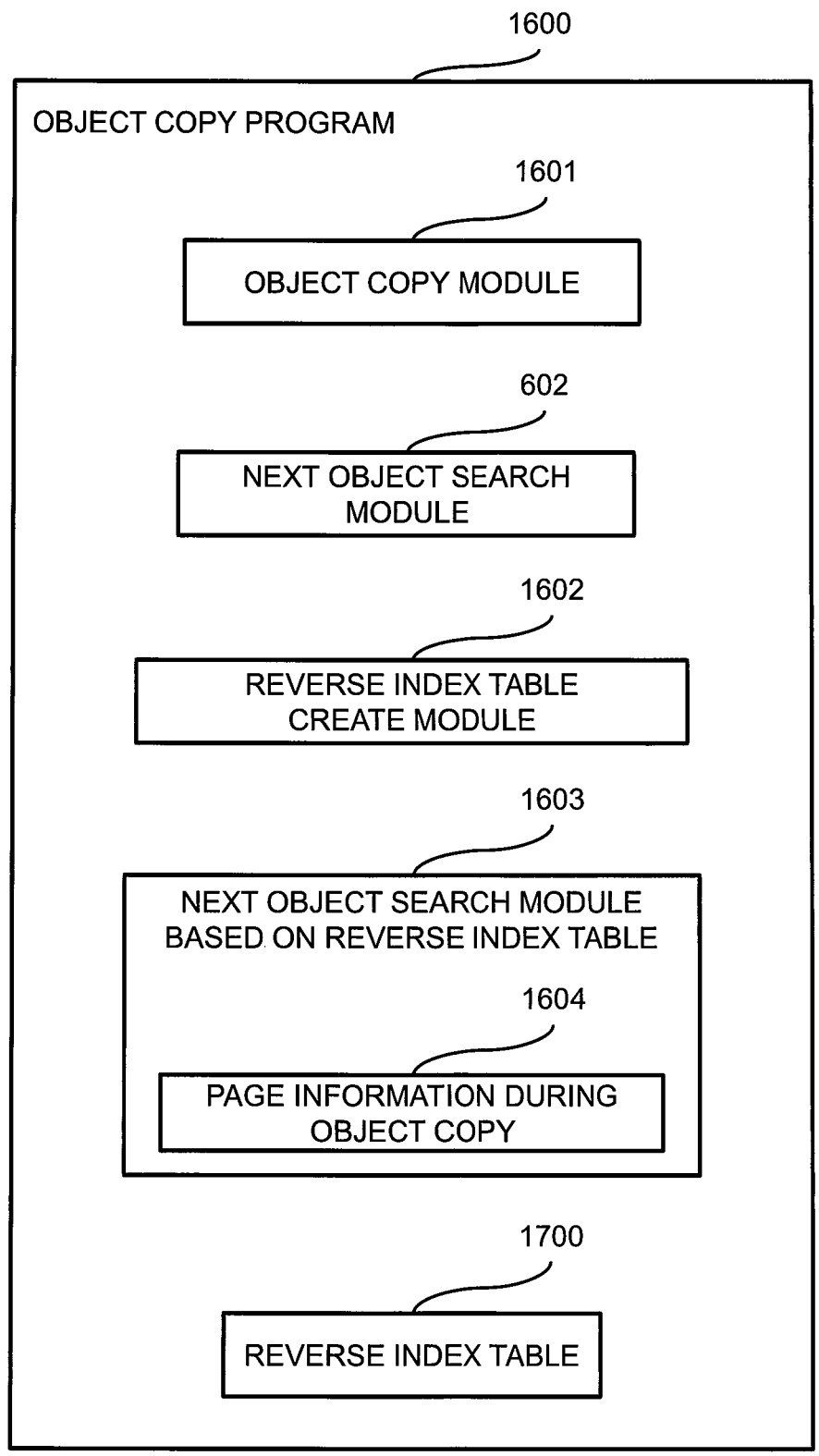
FIG. 16 is a view showing an internal configuration of an object copy program according to embodiment 2.

FIG. 16 is a block diagram showing the functional configuration of the object copy program 1600 according to embodiment 2. The object copy program 1600 is equipped with an object copy module 1601, a next object search module 602 (which is the same as the module 602 in the object copy program 600 of embodiment 1 (FIG. 6)), a reverse index table create module 1602, a next object search module 1603 based on the reverse index table, and a reverse index table 1700.

The object copy module 1601 is executed by the CPU 104 of the file server 200 based on an instruction from the administrator via the management program 203. The object copy module 1601 copies the object stored in file system A 311 to file system B 313. The difference of the present module from the object copy module 601 according to embodiment 1 is that a revere index table 1700 is created when the capacity utilization information 317 of the storage pool 309 is increased to be equal to or greater than the copy method change threshold 609, and thereafter, the copy order is determined via a next object search module 17603 based on the reverse index table.

The next object search module 602 executes a similar process as embodiment 1.

The reverse index table create module 1602 is executed by the CPU 104 of the file server 200 when called by the object copy module 1601. The reverse index table create module 1602 scans the file system and creates a reverse index table 1700.

The next object search module 1603 based on the reverse index table is executed by the CPU 104 of the file server 200 when called by the object copy module 1601. The next object search module 1603 based on the reverse index table determines the copy order of the object so that files are copied in page units based on the reverse index table 1700.

The next object search module 1603 based on the reverse index table has a page information during object copy 1604, and the logical page number of the page in which object is being currently copied is retained as an internal status using the reverse index table 1700. The initial value of the page information during object copy 1604 is a front page of the logical volume A 310 in which the file system A 311 is created. When no more objects exist within the page designated by the page information during object copy 1604, the page information during object copy 1604 is changed to the next page.

The reverse index table 1700 is a table for searching the object using a block. The details of the configuration of the table will be described later with reference to FIG. 17.

FIG. 17 is a view showing a configuration of a reverse index table 1700 according to embodiment 2. The reverse index table 1700 is composed of a block number 1700A, a size (unit: block) 1700B and a path name 1700C as a single entry.

A single entry of the reverse index table 1700 means that the blocks corresponding to size (unit: block) 1700B starting from block number 1700A are used by the object designated by path name 1700C.

Figure 18:
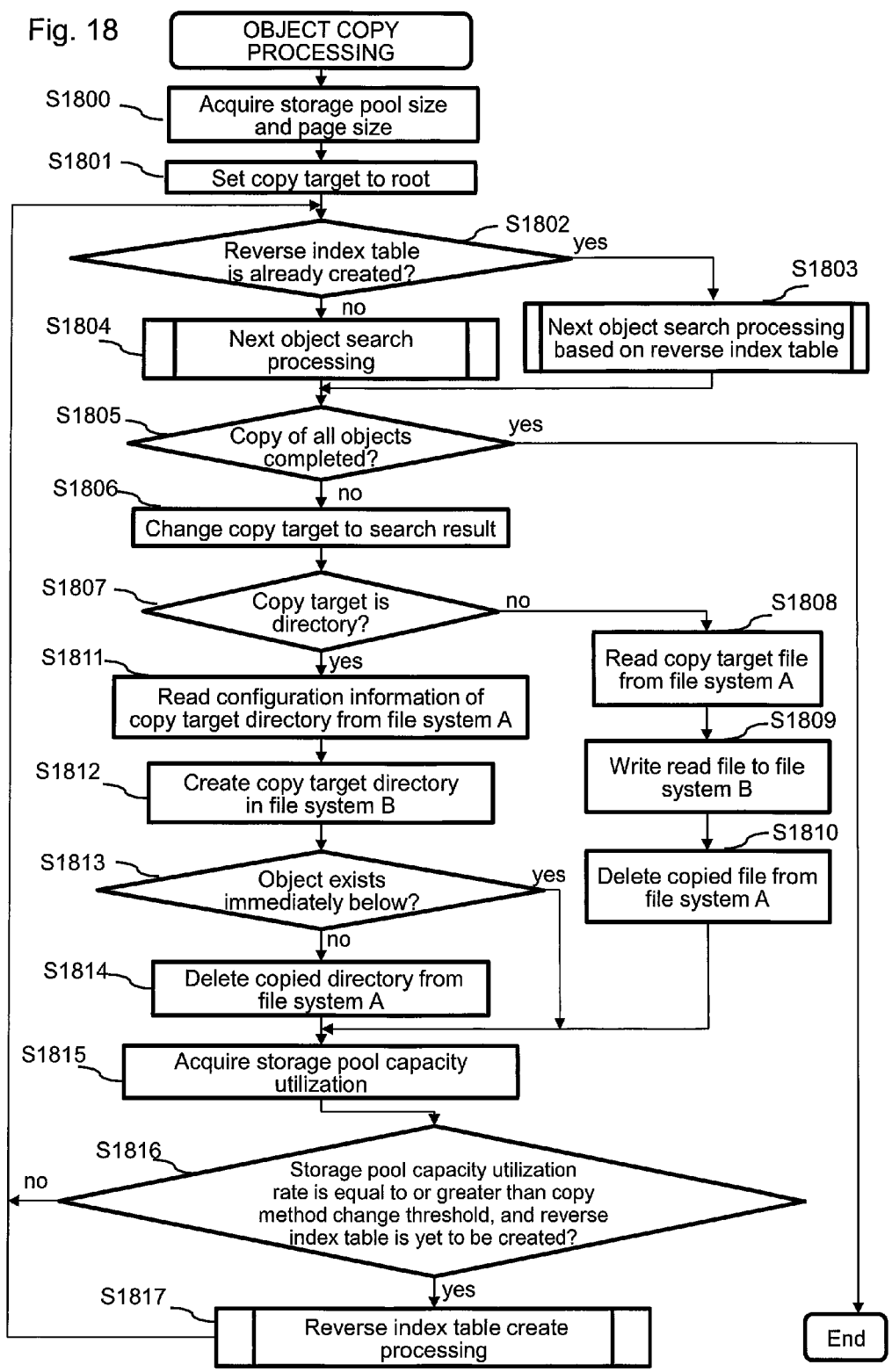
FIG. 18 is a flowchart showing one example of an object copy processing according to embodiment 2.

FIG. 18 shows one example of a flowchart for describing the details of an object copy processing executed by the object copy module 1601. The object copy module 1601 is executed by an instruction from the administrator via the management program 203.

At first, the object copy module 1601 acquires the storage pool size information 315 and the page size information 314 (S1800).

As an argument of the next object search processing S1804 or the next object search processing S1803 based on the reverse index table, the copy target object is set as the root directory (S1801). Thereby, the start position of search of the object to be copied will be the root directory.

Whether the reverse index table 1700 is already created or not is determined (S1802). If the reverse index table 1700 is already created (if S1802 is yes), the module calls the next object search processing based on the reverse index table by setting the copy target object as the argument, and the next object to be copied is obtained (S1803). The details of the next object search processing based on the reverse index table will be described later with reference to FIG. 20.

If the reverse index table 1700 is not created (if S1802 is no), the next object search processing (FIG. 10) is called by setting the copy target object as the argument, and the next object to be copied is obtained (S1804).

Next, whether the search result of the next object search processing S1803 based on the reverse index table or the next object search processing S1804 means that copying of all objects have been completed or not is determined (S1805). If the result of search of both search processes means that copying of all objects have been completed (if S1805 is yes), the object copy processing is ended.

If the result of search of both search processes does not mean that the copying of all objects have been completed (if S1805 is no), the object returned as the search result by both search processes is set as the copy target object (S1806).

Thereafter, whether the copy target object is a directory or not is determined (S1807). If the copy target object is not a directory but a file (if S1807 is no), the copy target file is read from the file system A 311 via the file system program A 205 (S1808). Thereafter, the read file is written to the file system B 313 via the file system program B 206 (S1809). Thereafter, the copy target file is deleted from the file system A 311 via the file system program A 205 (S1810).

On the other hand, if the copy target object is a directory (if S1807 is yes), the configuration information of the copy target directory is read from the file system A 311 via the file system program A 205 (S1811). Next, the copy target directory is created in the file system B 313 via the file system program B 206 (S1812). Thereafter, the copy target directory determines whether or not an object exists immediately below the file system A 311 (S1813). If there is no object immediately below the file system A (if S1813 is no), the copy target directory is deleted from the file system A 311 via the file system program A 205 (S1814).

After the process of S1814, or after the process of S1810, or if an object exists immediately below the file system A according to the determination of S1813 (if S1813 is yes), the capacity utilization information 317 of the storage pool 309 is acquired (S1815).

Thereafter, whether or not the storage capacity utilization rate is equal to or greater than the copy method change threshold 609 and that the reverse index table is not created is determined (S1816). If the storage capacity utilization rate is greater than the copy method change threshold 609 and that the reverse index table is not created (if S1816 is yes), a reverse index table create processing (FIG. 19) is activated and a create processing is performed (S1817).

The reverse index table create processing can be executed simultaneously as the object copy processing by execution via a thread that differs from the object copy processing, so that the object copy processing can be prevented from being stopped. In that case, the object copy processing is not required to wait for the reverse index table create processing to end. The reverse index table create processing will be described later with reference to FIG. 19. The storage capacity utilization rate will be computed as according to the aforementioned Expression 2.

After completing the present reverse index table create processing (S1817), or if the determination processing of S1816 is denied (if S1816 is no), the procedure returns to the determination process of S1802.

Figure 19:
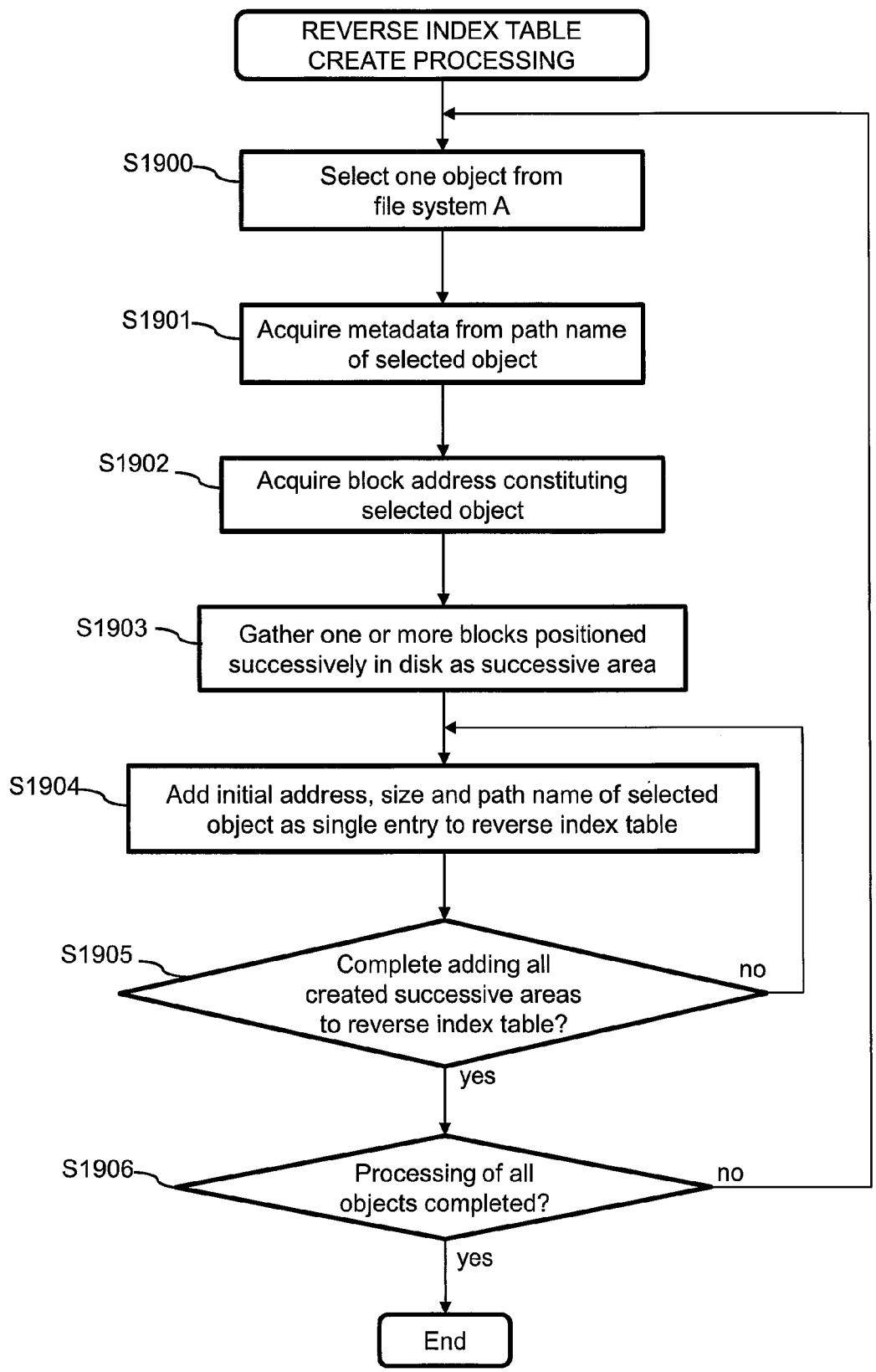
FIG. 19 is a flowchart showing one example of a reverse index table create processing according to embodiment 2.

FIG. 19 is an example of the flowchart for describing the details of the reverse index table create processing executed by the reverse index table create module 1602. The reverse index table create module 1602 is executed when a call is output from the object copy module 1601.

The reverse index table create processing executes the processes from S1900 to S1906 for all the objects in the file system A 311.

One object is selected from the objects within the file system A 311 (1900). One method for determining the order for selecting objects follows the directory structure described in FIG. 5 from the root directory of the file system A 311.

Based on the path name of the selected object, the object metadata 403 is acquired from the file system A 311 via the file system program A 205 (S1901).

The module acquires a block address 407 that the acquired metadata has (S1902).

Out of the block addresses acquired in S1902, the successive blocks are considered as a single area, and the block address and the size of the initial block of the area are acquired (S1903).

The initial address, the size (unit: number of blocks) and the path name of the object acquired regarding the area is added as a single entry to the reverse index table 1700 (S1904).

Next, whether all the created successive areas have been added to the reverse index table 1700 or not is determined. If an area which is not added to the reverse index table 1700 exists (if S1905 is no), the procedure returns to S1904. On the other hand, if the information of all successive areas have been added to the reverse index table 1700 (if S1905 is yes), the procedure advances to S1906.

Thereafter, whether the process for adding the information of all objects to the reverse index table 1700 has been completed or not is determined (S1906). If the information of all objects have not been completely added to the reverse index table 1700 (if S1906 is no), the procedure returns to S1900. On the other hand, if the information of all objects have been completely added to the reverse index table 1700 (if S1906 is yes), the procedure is ended.

Figure 20:
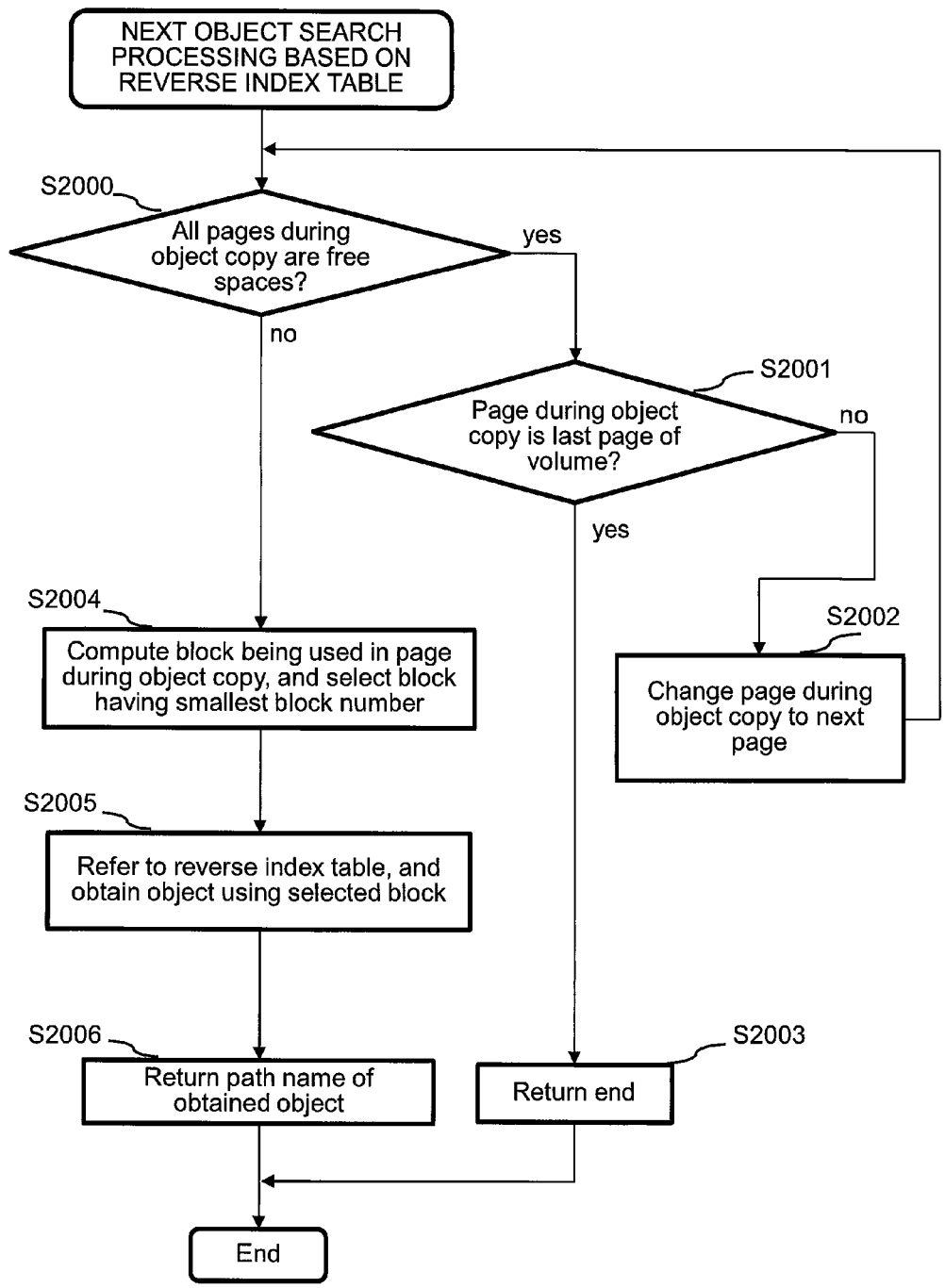
FIG. 20 is a flowchart showing one example of a next object search processing based on a reverse index table according to embodiment 2.

FIG. 20 shows one example of a flowchart for describing the details of a next object search processing based on the reverse index table executed by the next object search module 1603 based on the reverse index table. The next object search module based on the reverse index table is executed when called by the object copy module 1601.

At first, whether all areas of the page designated by the page information during object copy 1604 are free spaces or not is determined (S2000). Here, the method for determining whether all areas of the page designated by the page information during object copy 1604 are free spaces or not is similar to the page collecting processing of FIG. 13.

If the areas are all free spaces (if S2000 is yes), whether the page having the object copied is a last page of the logical volume A 310 or not is determined.

If the page having the object copied is not a last page of the logical volume A 310 (if S2001 is no), the page designated by the page information during object copy 1604 is advanced to the next page, and the procedure returns to the process of S2000 (S2002).

If the page having the object copied is the last page of the logical volume A 310 (if S2001 is yes), the information indicating that the search has been completed is returned to the call source (S2003) and the process is ended.

If an area being used exists in the page designated by the page information during object copy 1604 (if S2000 is no), the block having the smallest block number is selected from the areas being used within the page (S2004).

The reverse index table 1700 is referred to, and the path name of the object using the selected block is obtained (S2005).

The path name having been obtained is returned to the call source (S2006), and the process is ended.

As described, according to embodiment 2 of the present invention, during migration of a file system by copying objects, copying can be started targeting the objects located within the same page. Thereby, a page can be released immediately when the copied objects are deleted.

REFERENCE SIGNS LIST

100 Management terminal
101 Client
102 LAN
103 Network I/F
104 CPU of file server 200
105 Storage I/F of file server 200
106 SAN
107 Storage I/F of storage subsystem 300
108 CPU of storage subsystem 300
109 Disk I/F of storage subsystem 300
200 File server
201 Memory of file server 200
300 Storage subsystem
301 Memory of storage subsystem 300
308, 422 Disk
309, 413 Storage pool
400 File system
420 Page
421 Logical volume
600, 1600 Object copy program
800 Volume management table
1700 Reverse index table

The invention claimed is:

1. A storage system comprising:
  a file server having a first processor and first memory having instructions that, when executed by the first processor, cause the first processor to manage a plurality of files; and
  a storage subsystem having a plurality of storage devices, a second processor and second memory having instructions that, when executed by the second processor, cause the second processor to:
  provide a pool area managed as a plurality of pages, and store file data of the files managed by the file server by allocating the pool area in units via the plurality of pages,
    wherein, when the file server receives a copy command regarding a plurality of target files of the files stored in the pool area, the first processor is further caused to:
    sequentially copy the target files to a newly allocated pool area, release the pages in which the file data of each of the target files having been copied has been stored, and
    when a utilization rate of the pool area exceeds a predetermined threshold:
      specify one of said target files stored in N number of pages, N being an integer of 2 or greater,
      specify a next target file to be sequentially copied immediately after the specified target file stored in the N number of pages,
      change the location of the file data of the specified next target file so that the specified target file and specified next target file are located in N−1 or fewer pages, and to free one or more pages from storing the file data thereof,
      immediately release the one or more pages having been freed by the location change,
      wherein the file data of the specified target file and the specified next target file are located in the N−1 or fewer pages in an order in which the file data thereof is to be sequentially copied.

2. The storage system according to claim 1, wherein the first processor is further caused to:
  change the location of the file data based on a throughput of the copy processing and a throughput of the location change processing.

3. The storage system according to claim 1, wherein the first processor is further caused to:
  performs the location change based on a throughput of the copy processing and a throughput of the location change processing.

4. The storage system according to claim 1, wherein the first processor is further caused to:
  performs the location change regarding the file data based on a size of a used area of the pool area.

5. The storage system according to claim 1, wherein the copy command is in regards to a target directory containing the target files, and
the first processor is further caused to:
copy the target files based on the target directory until a utilization rate of the pool area of the copy destination exceeds a given threshold.

6. The storage system according to claim 1, wherein the first processor is further caused to:
specify a sequence of the target files starting from one of the files at a close positional relationship in a logical volume composed from the plurality of storage devices; and changes a copy destination in the pool area being copied so that the target file being to be copied is located in a respective same page.

\* \* \* \* \*